US012587352B2

(12) United States Patent
Shanafelt

(10) Patent No.: US 12,587,352 B2
(45) Date of Patent: Mar. 24, 2026

(54) FULL DUPLEX ADAPTIVE ARRAY

(71) Applicant: TM IP HOLDINGS, LLC, Little Switzerland, NC (US)

(72) Inventor: Robert E. Shanafelt, Seattle, WA (US)

(73) Assignee: TM IP HOLDINGS, LLC, Little Switzerland, NC (US)

( * ) Notice: Subject to any disclaimer, the term of this patent is extended or adjusted under 35 U.S.C. 154(b) by 273 days.

(21) Appl. No.: 18/105,742

(22) Filed: Feb. 3, 2023

(65) Prior Publication Data

US 2024/0267195 A1     Aug. 8, 2024

(51) Int. Cl.
H04W 4/00      (2018.01)
H04B 1/16      (2006.01)
H04B 7/0456      (2017.01)
H04L 5/14      (2006.01)

(52) U.S. Cl.
CPC ......... H04L 5/1461 (2013.01); H04B 1/1676 (2013.01); H04B 7/0456 (2013.01)

(58) Field of Classification Search
CPC ... H04L 5/1461; H04B 1/1676; H04B 7/0456; H04B 1/525
See application file for complete search history.

(56) References Cited

U.S. PATENT DOCUMENTS

| | | |
|---|---|---|
| 3,968,486 A | 7/1976 | Gerdes |
| 4,259,888 A | 4/1981 | Gross |
| 4,301,415 A | 11/1981 | McFayden |
| 4,318,055 A | 3/1982 | Hopwood et al. |
| 4,342,245 A | 8/1982 | Gross |
| 4,584,534 A | 4/1986 | Lijphart et al. |
| 4,613,974 A | 9/1986 | Vokac et al. |
| 4,680,633 A | 7/1987 | Gerdes et al. |

(Continued)

FOREIGN PATENT DOCUMENTS

| | | |
|---|---|---|
| TW | 201742414 | 12/2017 |
| WO | WO2014145868 | 9/2014 |
| WO | WO2017184743 | 10/2017 |

OTHER PUBLICATIONS

International Search Report and Written Opinion for International Application No. PCT/US2024/011676, mailed May 16, 2024, 9 pages.

(Continued)

*Primary Examiner* — Stephen M D Agosta
(74) *Attorney, Agent, or Firm* — HAYES SOLOWAY P.C.

(57)      ABSTRACT

A system and method for self-interference cancellation using a full duplex adaptive array includes at least four ports within the network array, with at least two transmission elements at a first port and a second port, and at least one receiving element at a third port and a fourth port. A signal is transmitted along a first network path from the two transmission elements of the first port to the receiving element of the fourth port. The signal is transmitted along a second network path from the two transmission elements of the first port to the receiving element of the third port. A weight is applied to at least one of the two transmission elements of the first port, which modifies the signal transmitted along the second network path to cancel signal interference caused by the signal at the third port during full duplex operation of the network array.

20 Claims, 18 Drawing Sheets
(13 of 18 Drawing Sheet(s) Filed in Color)

(56) References Cited

U.S. PATENT DOCUMENTS

| | | | |
|---|---|---|---|
| 4,803,705 A | 2/1989 | Gillingham et al. | |
| 4,989,219 A | 1/1991 | Gerdes et al. | |
| 5,021,786 A | 6/1991 | Gerdes | |
| 5,124,706 A | 6/1992 | Gerdes | |
| 5,155,672 A | 10/1992 | Brown | |
| 5,165,017 A | 11/1992 | Eddington et al. | |
| 5,184,218 A | 2/1993 | Gerdes | |
| 5,200,715 A | 4/1993 | Gerdes et al. | |
| 5,200,822 A | 4/1993 | Bronfin et al. | |
| 5,327,237 A | 7/1994 | Gerdes et al. | |
| 5,511,100 A | 4/1996 | Lundberg et al. | |
| 5,557,333 A | 9/1996 | Jungo et al. | |
| 6,522,697 B1 | 2/2003 | Spickermann | |
| 6,559,757 B1 | 5/2003 | Deller et al. | |
| 6,788,154 B2 | 9/2004 | Maneatis | |
| 6,829,310 B1 | 12/2004 | Nasta et al. | |
| 7,813,433 B2 | 10/2010 | Moffatt | |
| 7,856,050 B1 | 12/2010 | Wiss et al. | |
| 8,537,952 B1 | 9/2013 | Arora | |
| 9,014,293 B2 | 4/2015 | Gerdes | |
| 9,194,946 B1 | 11/2015 | Vacanti | |
| 9,338,041 B1 | 5/2016 | Gerdes | |
| 9,338,042 B1 | 5/2016 | Gerdes | |
| 9,516,490 B1 | 12/2016 | Gerdes et al. | |
| 9,716,997 B1 | 7/2017 | Gerdes et al. | |
| 9,883,375 B2 | 1/2018 | Gerdes et al. | |
| 10,454,727 B2 | 10/2019 | Woodsum et al. | |
| 10,763,993 B2 | 9/2020 | Eroz et al. | |
| 11,184,200 B2 | 11/2021 | Woodsum et al. | |
| 11,342,982 B2 * | 5/2022 | Thurfjell | H04L 25/0224 |
| 11,895,690 B2 * | 2/2024 | Takeda | H04L 1/0013 |
| 2003/0053794 A1 | 3/2003 | Krouglov et al. | |
| 2003/0074684 A1 | 4/2003 | Noon | |
| 2003/0095590 A1 * | 5/2003 | Fuller | H04B 1/71075 |
| | | | 375/E1.031 |
| 2003/0108088 A1 | 6/2003 | Odenwalder et al. | |
| 2004/0012387 A1 * | 1/2004 | Shattil | H05K 9/00 |
| | | | 324/225 |
| 2004/0247041 A1 | 12/2004 | Biedka et al. | |
| 2004/0252531 A1 | 12/2004 | Cheng et al. | |
| 2005/0030160 A1 | 2/2005 | Goren et al. | |
| 2005/0065901 A1 | 3/2005 | Diong | |
| 2005/0114663 A1 | 5/2005 | Cornell et al. | |
| 2005/0187755 A1 | 8/2005 | Jurion et al. | |
| 2005/0200391 A1 | 9/2005 | Steinbach et al. | |
| 2006/0006914 A1 | 1/2006 | Fan-Jiang | |
| 2006/0197564 A1 | 9/2006 | Yen | |
| 2007/0084920 A1 | 4/2007 | Slatter et al. | |
| 2007/0277035 A1 | 11/2007 | Patel et al. | |
| 2008/0041485 A1 | 2/2008 | Anagnostopoulos | |
| 2008/0159256 A1 * | 7/2008 | Faska | H04L 49/351 |
| | | | 370/349 |
| 2009/0007246 A1 | 1/2009 | Gutowski et al. | |
| 2009/0088077 A1 | 4/2009 | Brown et al. | |
| 2009/0135957 A1 | 5/2009 | Norris et al. | |
| 2010/0111225 A1 | 5/2010 | Kroeger | |
| 2010/0203854 A1 | 8/2010 | Yu et al. | |
| 2011/0043039 A1 | 2/2011 | Fagola | |
| 2012/0155344 A1 | 6/2012 | Wiley et al. | |
| 2012/0171963 A1 | 7/2012 | Tsfaty | |
| 2013/0010955 A1 | 1/2013 | Lu et al. | |
| 2013/0244594 A1 | 9/2013 | Alrabadi et al. | |
| 2013/0301487 A1 * | 11/2013 | Khandani | H04B 7/0413 |
| | | | 370/278 |
| 2013/0343235 A1 * | 12/2013 | Khan | H04B 1/56 |
| | | | 370/278 |
| 2014/0201212 A1 | 7/2014 | Qi et al. | |
| 2015/0023456 A1 | 1/2015 | Vann et al. | |
| 2015/0092621 A1 | 4/2015 | Jalloul et al. | |
| 2015/0237460 A1 | 8/2015 | Goyal et al. | |
| 2016/0013831 A1 | 1/2016 | Lea et al. | |
| 2016/0173302 A1 | 6/2016 | Gerdes | |
| 2016/0191227 A1 * | 6/2016 | Pagano | H04B 7/0413 |
| | | | 370/281 |
| 2016/0254870 A1 * | 9/2016 | O'Keeffe | H04B 17/14 |
| | | | 455/67.14 |
| 2017/0012358 A1 * | 1/2017 | Feng | H04B 1/38 |
| 2017/0069974 A1 * | 3/2017 | Shamblin | H01Q 21/28 |
| 2017/0093811 A1 | 3/2017 | Dolev et al. | |
| 2017/0214417 A1 * | 7/2017 | Jian | H04B 1/0057 |
| 2017/0251062 A1 | 8/2017 | Lu et al. | |
| 2017/0325085 A1 | 11/2017 | Gerdes et al. | |
| 2017/0373403 A1 * | 12/2017 | Watson | H01Q 9/04 |
| 2018/0123634 A1 * | 5/2018 | Settaf | H04B 1/48 |
| 2018/0123635 A1 * | 5/2018 | Settaf | H04B 1/48 |
| 2018/0124048 A1 | 5/2018 | Yoo | |
| 2018/0152833 A1 | 5/2018 | Gerdes et al. | |
| 2018/0176134 A1 | 6/2018 | Liu et al. | |
| 2019/0027823 A1 * | 1/2019 | Matitsine | H01Q 3/24 |
| 2019/0206420 A1 | 7/2019 | Kandade Rajan et al. | |
| 2019/0319828 A1 | 10/2019 | Gerdes et al. | |
| 2019/0356364 A1 * | 11/2019 | Maamari | H04L 5/0062 |
| 2019/0372822 A1 | 12/2019 | Woodsum | |
| 2020/0112328 A1 * | 4/2020 | Andersson | H04B 1/44 |
| 2020/0382177 A1 * | 12/2020 | Lee | H04B 7/0456 |
| 2021/0104821 A1 * | 4/2021 | Gurbuz | H01Q 13/106 |
| 2021/0119672 A1 * | 4/2021 | Gabriel | H04B 7/0617 |
| 2021/0126757 A1 * | 4/2021 | Nishimoto | H04L 5/0023 |
| 2021/0144537 A1 * | 5/2021 | Ben Tolila | H04B 17/318 |
| 2021/0194565 A1 * | 6/2021 | Paramesh | H04B 7/0617 |
| 2021/0350197 A1 | 11/2021 | Chow | |
| 2021/0367353 A1 * | 11/2021 | Meyer | H01Q 23/00 |
| 2021/0409056 A1 * | 12/2021 | Talwalkar | H04B 17/318 |
| 2022/0013906 A1 * | 1/2022 | Kinamon | H04W 28/18 |
| 2022/0094418 A1 * | 3/2022 | Polese | H04B 7/06952 |
| 2022/0109479 A1 * | 4/2022 | Liu | H04B 7/0636 |
| 2024/0039173 A1 * | 2/2024 | Ludlow | H01Q 25/008 |

OTHER PUBLICATIONS

International Search Report and Written Opinion for International Application No. PCT/US2024/014316, mailed May 13, 2024, 13 pages.

International Search Report and Written Opinion for International Application No. PCT/US2023/085262, mailed May 9, 2024, 17 pages.

International Search Report and Written Opinion for International Application No. PCT/US2024/23903, mailed Aug. 5, 2024, 10 pages.

Alwan H, Agarwal A. A Multipath Routing Approach for Secure and Reliable Data Delivery in Wireless Sensor Networks. International Journal of Distributed Sensor Networks. 2013;9(3). doi:10.1155/2013/232798.

Ahmed, et al., Full-Duplex Systems Using Multi-Reconfigurable Antennas, dated May 29, 2014, 31 pages.

Canadian Official Action dated May 23, 2023, issued in Canadian Application Serial No. 3,025,789, 4 pages.

Canadian Official Action dated May 23, 2023, issued in Canadian Application Serial No. 3,025,787, 4 pages.

EP Search Report in European Application No. 17786562.3, dated Apr. 1, 2019, 11 pages.

International Search Report and Written Opinion for International Application No. PCT/US 2017/028381, mailed Aug. 17, 2017, 7 pages.

T. M. Nguyen, "The behavior of a Costas loop in the presence of space telemetry signals," in IEEE Transactions on Communications, vol. 40, No. 1, pp. 190-198, Jan. 1992, doi: 10.1109/26.126720. keywords: {Telemetry;Bit rate;Signal processing;Doppler shift;Space missions;Phase shift keying;Tracking loops;Filters;Additive white noise;Gaussian noise}.

* cited by examiner

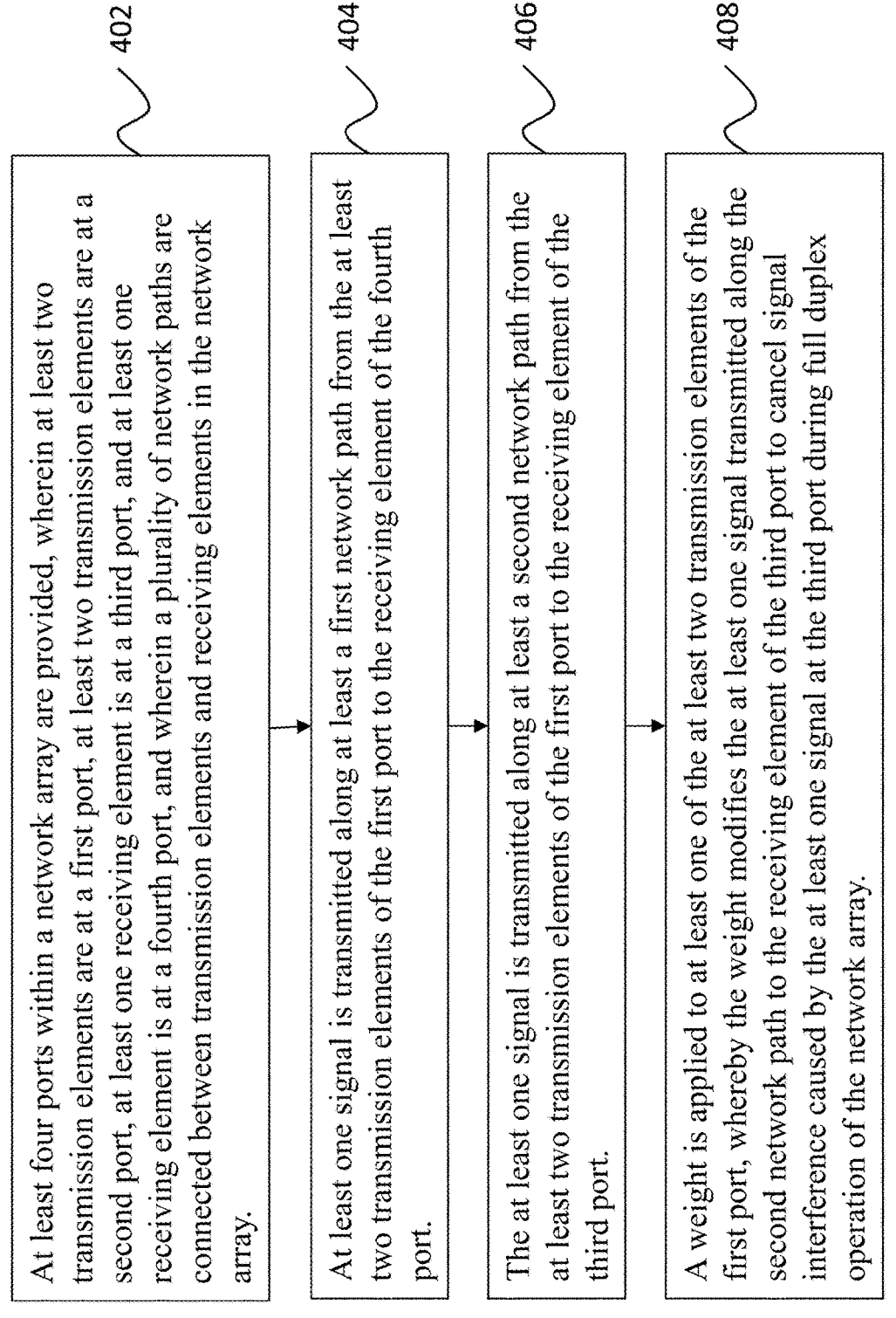

400

At least four ports within a network array are provided, wherein at least two transmission elements are at a first port, at least two transmission elements are at a second port, at least one receiving element is at a third port, and at least one receiving element is at a fourth port, and wherein a plurality of network paths are connected between transmission elements and receiving elements in the network array.

402

At least one signal is transmitted along at least a first network path from the at least two transmission elements of the first port to the receiving element of the fourth port.

404

The at least one signal is transmitted along at least a second network path from the at least two transmission elements of the first port to the receiving element of the third port.

406

A weight is applied to at least one of the at least two transmission elements of the first port, whereby the weight modifies the at least one signal transmitted along the second network path to the receiving element of the third port to cancel signal interference caused by the at least one signal at the third port during full duplex operation of the network array.

FULL DUPLEX ADAPTIVE ARRAY

FIELD OF THE DISCLOSURE

The present disclosure is generally related to devices and methods of signal transmission and processing, and more particularly is related to systems and methods of a full duplex adaptive array.

BACKGROUND OF THE DISCLOSURE

There are numerous techniques employed with data transmission to ensure that data signals can be both transmitted and received within a communication system. Early on, frequency division duplex or frequency-division multiplexing (FDM) were used, where the total bandwidth available in a communication path is divided into a series of non-overlapping frequency bands, and each of the bands is used to carry a separate signal. This technique allows for transmission and receiving of signals on a common channel, but at different frequencies, so there is no unwanted interference. However, this technique tends to use more bandwidth than is ideal or desired, since bandwidth is very expensive. It has also been commonplace to use time-division multiplexing (TDM), where independent signals are transmitted over a common link or signal path by using synchronized switches at each end of the transmission line so that each signal appears on the line only a fraction of time in an alternating pattern. This technique allows for transmission and receiving of signals on a common channel at different time intervals, and thus, it uses less frequency spectrum than FDM. However, it only allows for data transmission half of the time, which is inefficient because this inherently limits the data transmission rate. For data transmission applications that require large data transmission rates, such as digital streaming, gaming, and transmitting large data files, the data rate of transmission becomes important.

Full-duplex data transmission overcomes the bandwidth shortcomings of TDM and FDM. Full-duplex data transmission is when data can be transmitted in both a send direction and a receive direction on a single carrier at the same time, and as such makes use of the full bandwidth available. Full-duplex data transmission may use various devices and techniques to allow transmit and receive functions to occur over fewer channels than previously needed. For instance, in a four port system, two send wires and two receive wires are conventionally required for communication between two locations. Full duplex allows for the communication between the two locations over only two wires. A shortcoming of full-duplex transmission is the possibility of leakage, which is when the signal transmitted in one direction bleeds into the signal transmitted in the other direction, such that the signals may cause interference with each other.

Additionally, another issue with signal transmission is the considerable power required to transmit a signal over a long distance and ensure that the signal can successfully transmit across the link. High power is needed because there is a significant loss in transmitting the signal, as power decreases by $1/r^2$ such that doubling a transmission distance decreases the signal by $\frac{1}{4}$. In receiving a signal, the power received may be, for instance, 1 μW despite 1 W being originally transmitted. Due to this large separation between the transmitter and the receiver power, there is a significant probability of interference between the transmitted and received signals, especially with antennas which are in the same or a similar location. As such, this issue has caused many complications in the field of signal transmission.

Thus, a heretofore unaddressed need exists in the industry to address the aforementioned deficiencies and inadequacies.

SUMMARY OF THE DISCLOSURE

Embodiments of the present disclosure provide a full duplex adaptive array system. Briefly described, in architecture, one embodiment of the system, among others, can be implemented as follows. At least four ports are within the network array, wherein at least two transmission elements are at a first port, at least two transmission elements are at a second port, at least one receiving element is at a third port, and at least one receiving element is at a fourth port. A plurality of network paths are connected between transmission elements and receiving elements in the network array. At least one signal is transmitted along at least a first network path from the at least two transmission elements of the first port to the receiving element of the fourth port. The at least one signal is transmitted along at least a second network path from the at least two transmission elements of the first port to the receiving element of the third port. A weight is applied to at least one of the at least two transmission elements of the first port, wherein the weight modifies the at least one signal transmitted along the second network path to the receiving element of the third port to cancel signal interference caused by the at least one signal at the third port during full duplex operation of the network array.

Embodiments of the present disclosure provide a full duplex adaptive array system. Briefly described, in architecture, one embodiment of the system, among others, can be implemented as follows. At least four ports are within the network array, wherein at least two transmission elements are at a first port, at least two transmission elements are at a second port, at least one receiving element is at a third port, and at least one receiving element is at a fourth port. A plurality of network paths are connected between transmission elements and receiving elements in the network array. At least a first signal is transmitted along at least a first network path from the at least two transmission elements of the first port to the receiving element of the fourth port. The first signal is transmitted along at least a second network path from the at least two transmission elements of the first port to the receiving element of the third port. At least a second signal is transmitted along at least a third network path from the at least two transmission elements of the second port to the receiving element of the fourth port. The second signal is transmitted along at least a fourth network path from the at least two transmission elements of the second port to the receiving element of the third port. A first weight is applied to at least one of the at least two transmission elements of the first port, wherein the weight modifies the first signal transmitted along the second network path to the receiving element of the third port to cancel signal interference caused by the first signal at the third port during full duplex operation of the network array. A second weight is applied to at least one of the at least two transmission elements of the second port, wherein the weight modifies the second signal transmitted along the fourth network path to the receiving element of the fourth port to cancel signal interference caused by the second signal at the fourth port during full duplex operation of the network array.

The present disclosure can also be viewed as providing methods of self-interference cancellation using a full duplex adaptive array. In this regard, one embodiment of such a method, among others, can be broadly summarized by the following steps: A method of self-interference cancellation using a full duplex adaptive array, the method comprising: providing at least four ports within a network array, wherein at least two transmission elements are at a first port, at least two transmission elements are at a second port, at least one receiving element is at a third port, and at least one receiving element is at a fourth port, and wherein a plurality of network paths are connected between transmission elements and receiving elements in the network array; transmitting at least one signal along at least a first network path from the at least two transmission elements of the first port to the receiving element of the fourth port; transmitting the at least one signal along at least a second network path from the at least two transmission elements of the first port to the receiving element of the third port; and applying a weight to at least one of the at least two transmission elements of the first port, whereby the weight modifies the at least one signal transmitted along the second network path to the receiving element of the third port to cancel signal interference caused by the at least one signal at the third port during full duplex operation of the network array.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 13A-15 are various illustrations of the multielement array of a full duplex adaptive array system of FIG. 12, in accordance with exemplary embodiments of the present disclosure.

FIG. 16 is a flowchart illustrating a method of selfinterference cancellation using a full duplex adaptive array in accordance with exemplary embodiments of the disclosure.

DETAILED DESCRIPTION

Figure 1A:
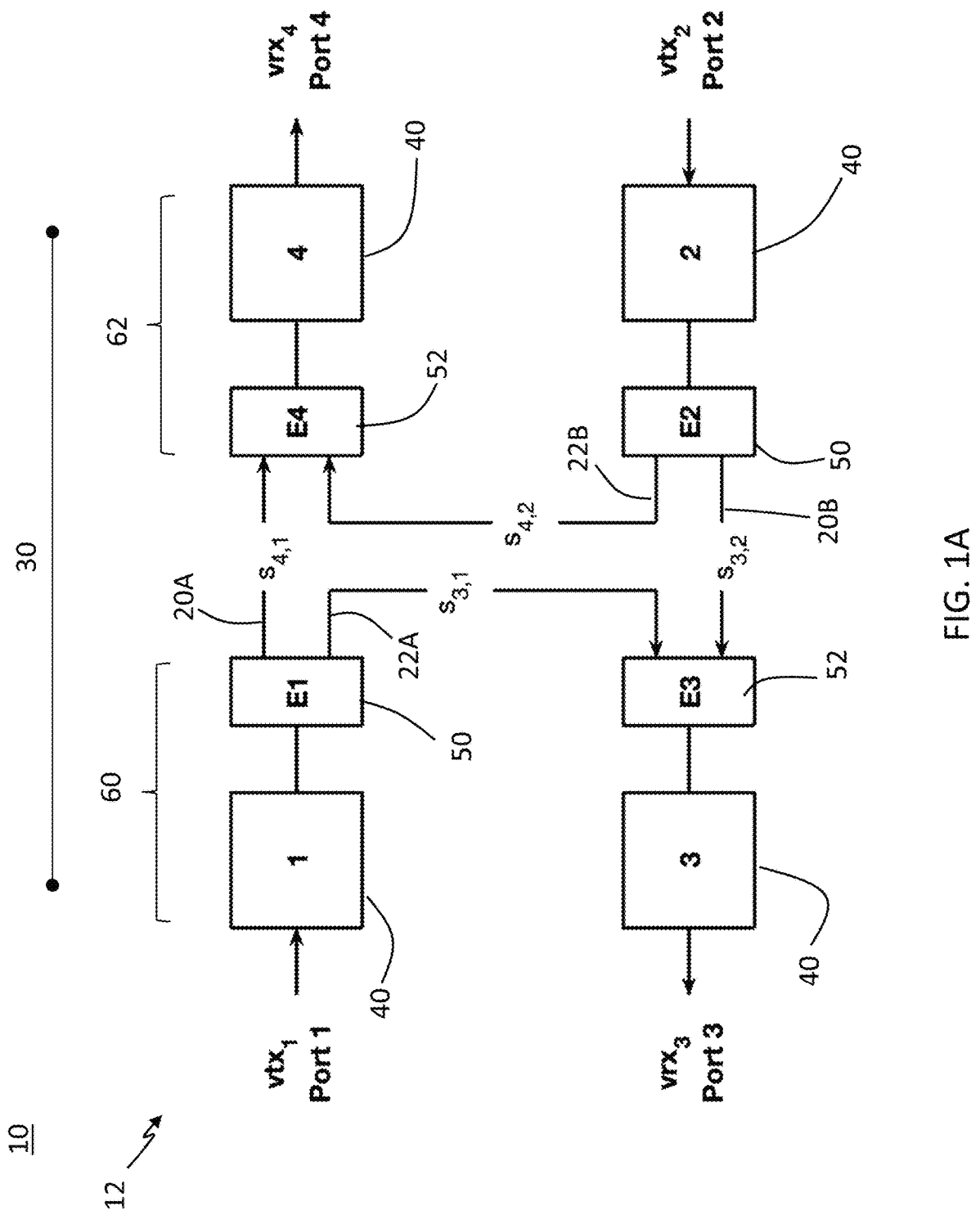
FIGS. 1A-1B are diagrammatic illustrations of a full duplex adaptive array system, in accordance with the present disclosure.

To improve over the problems in the signal transmission, in particular, with the interference between transmitted and received signals, the subject disclosure is directed to systems and methods employing a full duplex adaptive array. In broad terms, the full duplex adaptive array may make use of multiport transceivers and multi-element arrays at both ends of the communication link to provide self-interference rejection, to effectively cancel or subtract the interfering portions of a transmit signal from a receive signal, such that a non-interfered receive signal can be achieved. This technique may be accomplished using adapted weights for the respective transmit and receiving elements. These weights can be realized either by analog means or digital means. In one example, using digital weights may provide the desired flexibly and also provide for real time adjustment to address time varying multipath and nearby reflection. With additional processing, this technique can also be used to provide frequency compensation across the band of interest.

The subject disclosure may operate with a variety of network architectures that have a link or a plurality of links, where a link may be understood to be a signal path between two points or locations in a network. For instance, an exemplary link in this disclosure is the signal path between a base station and a remote, however any other network link may also be included. The networks and network architecture may range from simple two element arrays at both ends of the link to 16 element arrays at both ends. A subset of the array elements may be used to implement the different network architectures.

The functionality and performance of the subject disclosure has been modeled using the MATLAB® Antenna Toolbox, where the self-interference discussed within this disclosure has been modeled for each of the network configurations. For example, within this modeling, a two element transmit array was used to reduce the transmitter (Tx) to receiver (Rx) coupling to a level that supports use of 12-bit analogue to digital convert (ADC). A multi-port digital combiner was used for the final stage of cancellation. For typical systems, the self-interference cancellation may be desired to be on the order of 120 db.

To provide clarity in disclosure of the self-interference rejection, the subject disclosure uses an exemplary link between a base station and a remote, or a base station to base station. As is known in the art, in order to transmit signals successfully, there must be enough power in the signal to 'close the link', which is understood to mean that there must be enough power at the transmitter and enough signal at the receiving end in order to actually receive the signal across the physical distance of the link between the base station and the remote or other base station, such that the signal can be listened to or copied.

The link may be described using a link budget, which is understood as an accounting of all of the power gains and losses that a communication signal experiences in a tele-communication system, e.g., from a transmitter, through a communication medium such as radio waves, cable, wave-guide, or optical fiber, to the receiver. In the exemplary link, it is assumed that the transmit and receive antenna systems are the same at both ends of the link, e.g., as may be the case between base station to base station communication where the base stations are sized the same and are geographically stationary, but in practice it is noted that the transmit and receive antennae are often different, such as with cellular phone to base station communication.

The subject disclosure may be utilized in various capacities in network communications, including, with the back-haul of a network. The backhaul is understood as the portion of the network including the intermediate links between the core network, or backbone network, and the small subnet-works at the edge of the network. For example, in a generalized cellular network, cellular phones would connect to a base station, and the signal data received at the base station would then be relayed to other parts of the central network, such as the cloud, other base stations, or the rest of the cellular network. In this example, the link from a base station to a cellular phone may be 1 MHz, but if there are 10 cellular phones connecting to a base station, there will be 10 MHz at the base station. In order to ensure successful cellular communication, it may be important to ensure that the summed signal data at the base station can be further transmitted through the backhaul.

For the exemplary situation between a base station and another base station, a link budget may be described with the following equation:

$$Pr = Pt + Gt + Gr + fspl \qquad \text{Equation 1}$$

where the power received (Pr) is equal to the transmit power (Pt) plus the transmitter gain (Gt), plus the receiver gain (Gr), plus the free space path lost (fspl).

In one specific example to illustrate a link budget, analysis of a link budget may start with the frequency (f), where, for instance, f=3600 MHZ. The range (R) of the link may be, for instance, 2,000 m, which may be representative of a typi-cally physical distance of communication between base stations. The transmit power (Pt) may be 20 dbm, which is typical in network communication within the noted fre-quency. The receiver gain (Gr) at the receiver may be 6 db and the transmitter gain (Gt) at the transmitter may be 6 db. The free space path lost (fspl) may be −110 db at the noted frequency and distance. With the given parameters in this example, the receive power (Pr) is:

$$Pr = Pt + Gt + Gr + fspl = -78 \text{ dbm} \qquad \text{Equation 2}$$

Accordingly, this indicates how strong the receive signal is.

The next parameter desired to be known is the noise power (Pn), which indicates how much noise there is in the signal, which can be used to determine how far the link distance can be and still have a useful signal transmitted. The noise power may be calculated by the signal bandwidth (BW), which is 10 MHz in this example, and the noise figure (Nfig), which is 4 db. The noise figure indicates how much additional power over thermal noise that the receiver gen-erates. The noise power in this example may be calculated using the following equation:

$$Pn = -114 \text{ dbm} + 10 * \log 10(BW) + Nfig = -100 \text{ dbm} \qquad \text{Equation 3}$$

Next, the signal to noise ratio (SNR) is a parameter that is desired, which indicates how much signal there is over the noise. The SNR is given by the following equation:

$$SNR = Pr - Pn \qquad \text{Equation 4}$$

In the present example, the SNR is calculated to be (−78 dbm)-(−100 dbm), which equals 22 db.

It is next desired to know the self-interference cancella-tion (C) needed to reduce the transmitted power to the noise floor, which may be understood as the difference between the transmit power and the noise power, per the following equation:

$$C = Pn - Pt \qquad \text{Equation 5}$$

The difference between the transmit power and the noise power may identify the amount of cancellation (C) that is desired. Continuing with the example, the self-interference cancellation needed to reduce the transmitted power to the noise floor is (−100 dbm)-(20 dbm), which is equal to −120 db. This is understood to mean, in one example, that is 1 V is being transmitted, only 1 u V received at the receiver. This illustrates the challenge of achieving self-interference can-cellation, to which the subject disclosure provides a solution to.

From here, the signal to interference plus noise ratio (sinr) is given by Equation 5.1:

$$\text{sinr} = 10\log\left(\frac{P_r}{P_i + P_n}\right) \qquad \text{Equation 5.1}$$

where $P_i = P_r - C$. For a C of −120 dm, the snir=19 db or 3 db above the snr since $P_i = P_n$.

It is noted that these data points and parameters are provided only to provide clarity in disclosure, and are given as typical parameters and data points for the example given. Other data points and parameters may be used, depending on the design or intended use of the technology, all of which are considered within the scope of the present disclosure.

Figure 1B:
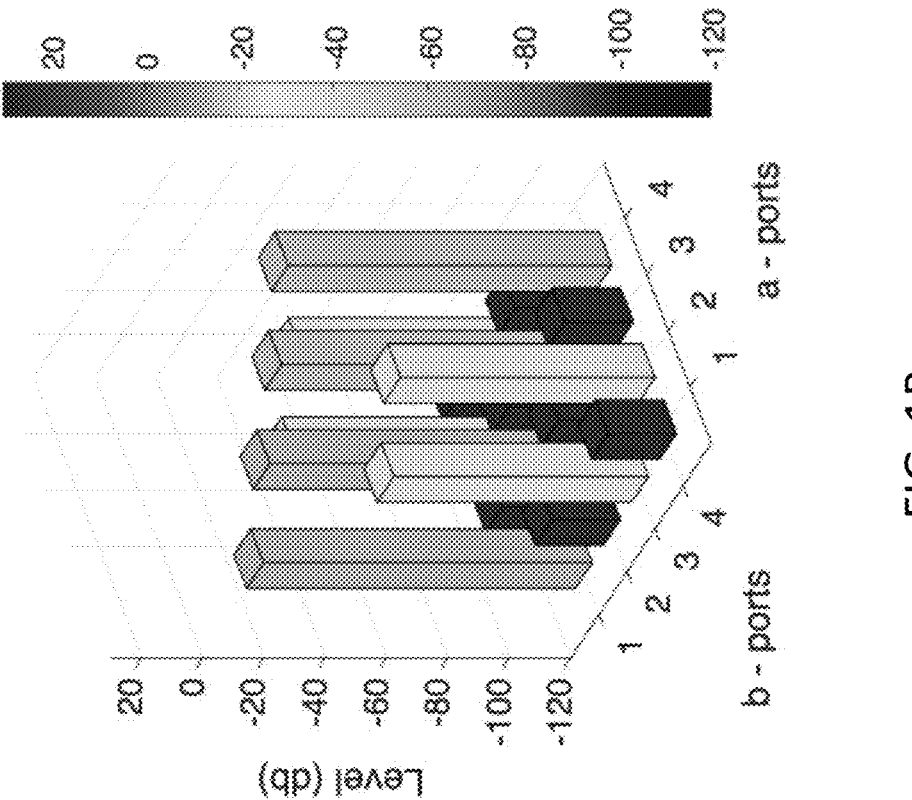

Turning next to FIGS. 1A-1B, these illustrations are diagrammatic illustrations of a full duplex system 10, in accordance with the present disclosure. The full duplex system 10, which may be referred to as 'system 10' may include a network array 12 for communication of data signals 20A, 20B over a link 30, or network path between parts of the array 12. The network array 12 may include any number of ports 40. In FIG. 1A, the network array 12 is depicted with four ports 40, identified numerically in FIG. 1A as port 1 through port 4, where two of the four ports 40 have a transmission element 50, e.g., at ports 1 and 2, which is identified with "E1" and "E2", while the other two of the four ports 40 have a receiving element 52, e.g., at ports 3 and 4, identified with "E3" and "E4." This diagram is representative a four port, four element array and a situation where there is signal transmission and signal receiving at a first location 60, e.g., encompassing ports 1 and 3, and a signal transmission and signal receiving at a second location 62, e.g., encompassing the other two ports, ports 2 and 4. In FIG. 1A, ports 1 and 2 are designated the transmit ports, whereas ports 3 and 4 are designated the receive ports.

During full duplex communication, it may be desired to transmit from port 1 to port 4 and from port 2 to port 3, such that signals are communicated from the first location 60 to the second location 62, and from the second location 62 to the first location 60. When this occurs, a first signal 20A may be transmitted from port 1 and received at port 4, which is identified with S-parameter $S_{4,1}$. A second signal 20B may be transmitted from port 2 and received at port 3, where this signal is identified with S-parameter $S_{3,2}$. In the example of FIG. 1A, ports 1 and 3 are designated with the first location 60 being a base station and ports 2 and 4 are designated as the second location 62 being the remote station, but the first and second locations 60, 62 can be any other exemplary locations, all of which are considered within the scope of the present disclosure. Using the parameters of the example previously discussed, the center frequency may be 3600 MHz and the coupling between ports 2 and 3, $s_{2,3}$, is −97 db. The coupling between ports 1 and 3, $s_{1,3}$, is −37 db. This results in the signal 20A from port 1 which completely masks the signal 20B from port 2, which is referred to as the self-interference. This coupling is primarily determined by the array element spacing which is on the order of 0.12 m versus the array separation of 2 km. Reducing or eliminating this coupling is the full duplex operation challenge.

As shown in FIG. 1A, the first signal 20A transmitted from E1 to E4 is also received at other receiving elements, including E3 of port 3, which is represented by interference signal 22A denoted with S-parameter $S_{3,1}$. Similarly, the second signal 20B transmitted from E2 to E3 is also received at other receiving elements, including E4 of port 4, which is represented by interference signal 22B denoted with S-parameter $S_{4,2}$. These interference signals 22A, 22B cause the self-interference at the receiving elements E3, E4, respectively, since they interfere with the originally intended signal, e.g., 20A or 20B, respectively, which is to be received at receiving elements E3 and E4, respectively. For example, as depicted in FIG. 1A, an interference signal 22A, identified with S-parameter $S_{3,1}$, may be transmitted from port 1 to port 3, and this signal may cause the self-interference from the first signal 20A, e.g., from $vtx_1$. Similarly, interference signal 22B, identified with S-parameter $S_{4,2}$, may be transmitted from port 2 to port 4, and this signal may cancel the self-interference from the second signal 20B, e.g., from $vtx_2$.

Mathematically, the signal transmission in the array of FIG. 1A may be described with the s-matrix in Equation 6, which shows the amplitude of the coupling between elements in db between the ports. More specifically, the s-matrix or s-parameter matrix in Equation 6 illustrates the scattering matrix for the simple four port network, where the input signal is represented by the a-vector and the output signal by the b-vector:

$$\begin{pmatrix} b_1 \\ b_2 \\ b_3 \\ b_4 \end{pmatrix} = \hspace{3cm} \text{Equation 6}$$

$$\begin{pmatrix} s_{1,1} & s_{1,2} & s_{1,3} & s_{1,4} \\ s_{2,1} & s_{2,2} & s_{2,3} & s_{2,4} \\ s_{3,1} & s_{3,2} & s_{3,3} & s_{3,4} \\ s_{4,1} & s_{4,2} & s_{4,3} & s_{4,4} \end{pmatrix} \begin{pmatrix} a_1 \\ a_2 \\ a_3 \\ a_4 \end{pmatrix} = \begin{pmatrix} a_1 s_{1,1} + a_2 s_{1,2} + a_3 s_{1,3} + a_4 s_{1,4} \\ a_1 s_{2,1} + a_2 s_{2,2} + a_3 s_{2,3} + a_4 s_{2,4} \\ a_1 s_{3,1} + a_2 s_{3,2} + a_3 s_{3,3} + a_4 s_{3,4} \\ a_1 s_{4,1} + a_2 s_{4,2} + a_3 s_{4,3} + a_4 s_{4,4} \end{pmatrix}$$

In Equation 6, the a-vector is representative of the incident voltage, while the b-vector is representative of the reflective voltage.

The voltage or signal level on a port is given by equation 7, where vrx is the voltage of the signal received at a port:

$$vrx = \frac{a+b}{2} \hspace{3cm} \text{Equation 7}$$

Using equation 7, it is possible to derive the signal level on the ports based on the identity matrix (I), e.g., where the values are 0 with the exception of the diagonal of the matrix which is 1. As is known, when the identity matrix is multiplied by another matrix, the resulting value is that matrix. Thus, when the identity matrix is utilized, Equation 7 is derived as shown in Equation 8:

$$vrx = \frac{a+b}{2} = \frac{(I+s)a}{2} = \frac{(I+s)vtx}{2} \hspace{2cm} \text{Equation 8}$$

Accordingly, this equation illustrates the voltage on the specific port that is being excited by a specific signal transmitted to that port.

FIG. 1B illustrates a bar chart depicting the signal levels of the ports 40 of the four port network array 12 depicted in FIG. 1A, which is derived based on the aforementioned equations. Specifically, FIG. 1B graphically depicts a combined bar chart showing the a and b port vectors, the s-matrix, and the vrx vectors. This allows for easy visual comparison of the self-interference level versus the desired level or signal-to-interference.

From these equations, it may be possible to calculate the voltage of the signal received, vrx, at any given port 40 in the array 12 when other ports are excited. For instance, to determine the voltage received at port 3 of the array 12 when port 1 and port 2 are excited, it is possible to use the following equation:

$$vrx_3 = \begin{pmatrix} s_{3,1} & s_{3,2} & s_{3,3} & s_{3,4} \end{pmatrix} \begin{pmatrix} vtx_1 \\ vtx_2 \\ 0 \\ 0 \end{pmatrix} = s_{3,1} vtx_1 + s_{3,2} vtx_2 \hspace{1cm} \text{Equation 9}$$

Here, S-parameters $s_{3,1}$ and $s_{3,2}$ are the relevant parameters, and it is desired for S-parameter $s_{3,1}$ to equal 0 and S-parameter $s_{3,2}$ to equal 1. When transmitting a signal on a link, S-parameter $s_{3,2}$ is a small value due to the propagation laws, e.g., the free space path lost. As such, then the S-parameter $s_{3,1}$ and $s_{3,2}$ are adjacent elements, the voltage transmitted from $s_{3,1}$ overpowers the voltage of S-parameter $s_{3,2}$ such that the $vtx_1$ term completely masks the $vtx_2$ term due to the self-interference. As a result, it becomes difficult to receive signal of $vtx_2$, which is a challenge of a full duplex system.

The subject disclosure may improve full duplex signal transmission by limiting or eliminating the self-interference in full duplex operation, namely, by providing the transmission of cancellation signals which limit or eliminate this self-interference by cancelling the interference signals. For instance, in one example, it may be possible to increase the element-to-element coupling from just one transmitter element to a receiver element, e.g., from port 1 to port 4, or from port 3 to port 2 in FIG. 1A, by adding an additional transmission element and weighting the element for the transmit signal to provide a cancellation signal which cancels the interference of an interference signal. These cancellation signals can be achieved by setting the respective Tx levels prior to the digital-to-analog converter (DAC) to produce the desired amplitudes and phases to cancel or reduce the signal levels at each Rx port. More specifically, Tx to Rx self-interference can be reduced using a set of two Tx elements at each end of the link. For single Rx elements, the Tx coupling can be reduced to zero by setting the Tx weights to produce a null at the Rx element. When two or more Rx elements are used, it may be possible for only one element to be nulled, but both Rx elements can have a reduced signal level. When two or more Rx elements are used and weighted and combined, it is possible to reduce the Tx self-interference to zero on each end of the link.

Figure 2A:
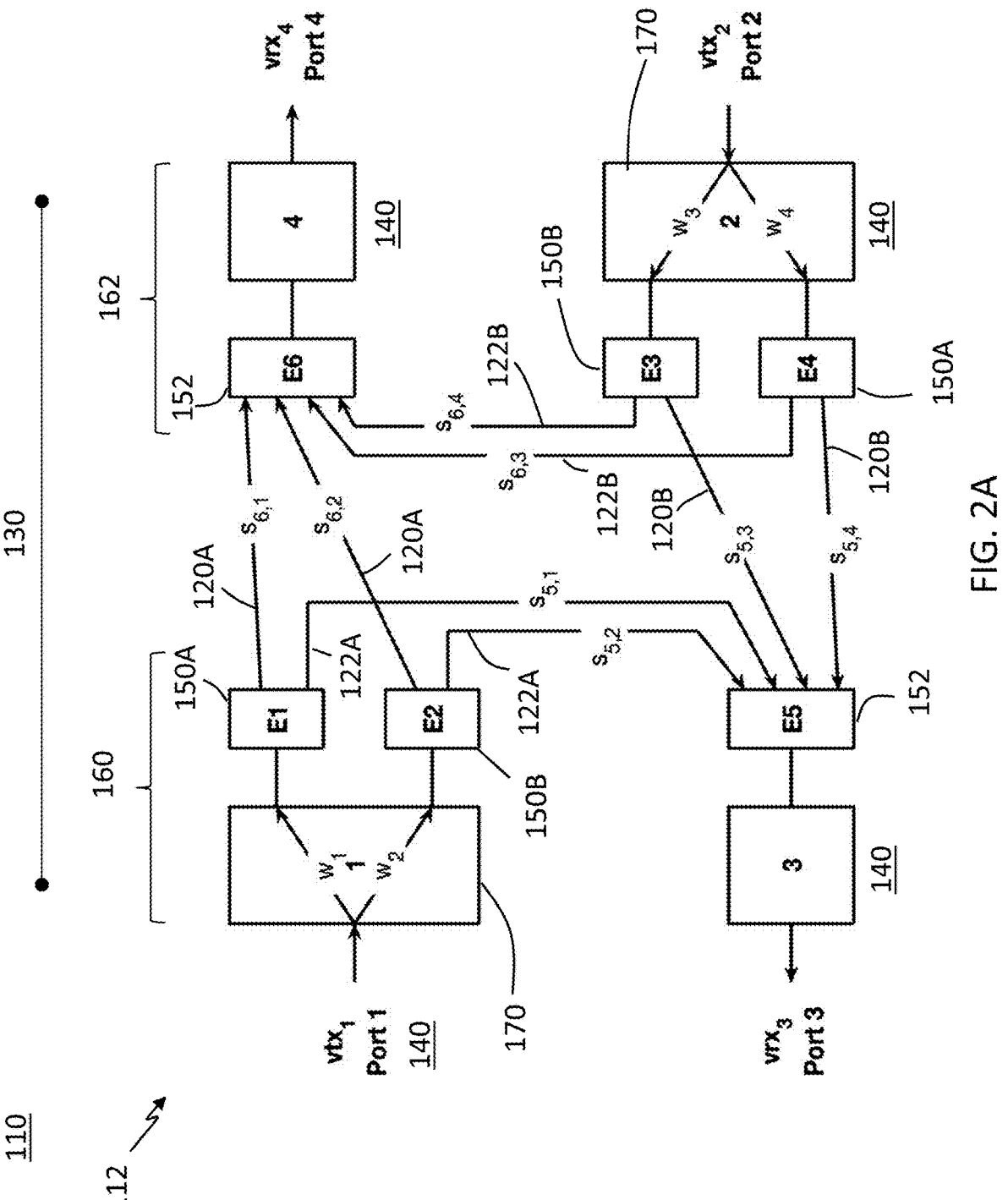
FIGS. 2A-2B are diagrammatic illustrations of a six element, full duplex adaptive array system, in accordance with exemplary embodiments of the present disclosure.
Figure 2B:
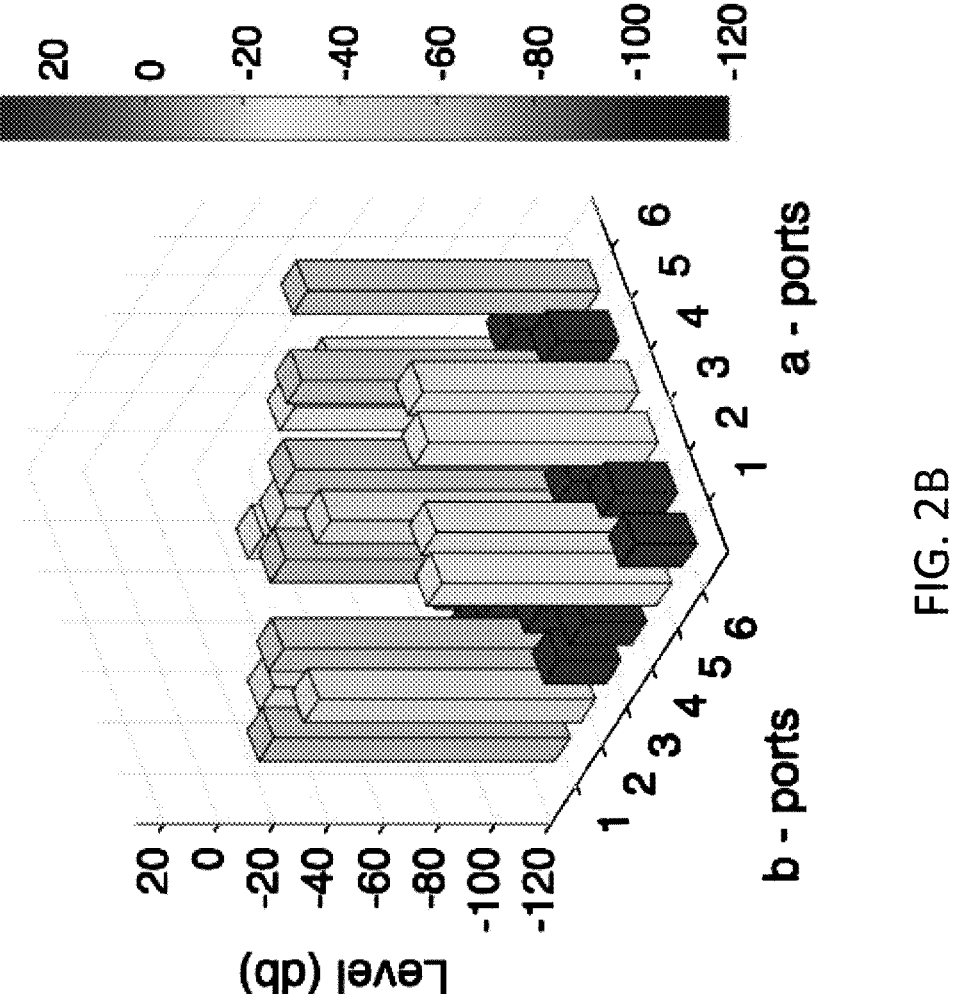

Continuing with the example of FIGS. 1A-1B, to achieve self-interference cancellation, the four port array of FIG. 1A can be transformed into a six element array to provide a four port, six element, full duplex network without the aforementioned signal interference. To this end, FIGS. 2A-2B are diagrammatic illustrations of a six element, full duplex adaptive array system 110, in accordance with exemplary embodiments of the present disclosure. As shown in FIG. 2A, in comparison to FIG. 1A, it may be possible to reduce the port 1 to port 3 coupling by adding a second Tx element 150B to each transmission side of the array 112, and in particular, at the transmitting ports 140, such that each location of the array 112 has one receiving element 152 and two transmission elements 150A, 150B, which can be denoted as 'R1T2'. For instance, in FIG. 2, the first location 160 has port 1 with two transmission elements 150A, 150B, identified as "E1" and "E2", while the second location 162 has port 2 with two transmission elements 150A, 150B, identified as "E3" and "E4." Each of the first and second locations 160, 162 also has one receiving element for each port, e.g., receiving element 154 denoted "E6" for port 4 and receiving element 152 denoted "E5" for port 3. This results in a 6 element network, which is reduced to a four port network by use of two Tx couplers/dividers, as shown, with one on each side of the array 112. This architecture provides a way of reducing the element-to-element coupling in each array 112 while preserving the transmission across the link 130 between the first location 160, e.g., the base station and the second location 162, e.g., remote or other base station.

The signal transmission within the six-element network of FIG. 2A may include a first signal 120A, identified with S-parameter $S_{6,1}$, transmitted from first transmission element 150A E1 of port 1 and received at the receiving element 152, E6, of port 4. The S-parameter of the signal reflects the coupling level between ports of the signal transmission in terms of magnitude and phase shift of the signal. The first signal 120A is also transmitted from second transmission element 150B E2 of port 1 and received at the receiving element 152, E6, at port 4. This signal is denoted with S-parameter $S_{6,2}$, On the opposing side of the full duplex array, a second signal 120B, denoted with S-parameter $S_{5,4}$, is transmitted from first transmission element 150A E4 of port 2 and received at the receiving element 152, E5, of port 3, and this signal is also transmitted from second transmission element 150B, E3, of port 2 and received at the receiving element 152, E5, of port 3, which is identified with S-parameter $S_{5,3}$.

Each of the transmission elements 150A, 150B of each transmit port may also communicate the cancellations signals for canceling self-interference with the first and the second signals 120A, 120B. The cancellation signals are weight-modified versions of the base signal transmitted from the transmission elements 150A, 150B of port 1 or port 2, respectively. For instance, cancellation signal 122A, identified with S-parameter $S_{5,1}$, may be transmitted from transmission element 150A E1 of port 1 to receiving element E5 of port 3, while cancellation signal 122A may be transmitted from transmission element 150B, E2, to receiving element E5 of port 3, and this signal is identified with S-parameter $S_{5,2}$. These cancellation signals 122A may cancel the self-interference from the first signal 120A, e.g., from $vtx_1$ through transmission elements E1 and E2 which may be received at receiving element E5 of port 3. Similarly, cancellation signal 122B, identified with S-parameter $S_{6,3}$ may be transmitted from the first transmission element 150A, E4, of port 2 to the receiving element E6 of port 4, while cancellation signal 122B may be transmitted from transmission element 150B, E3, to receiving element E6 of port 4, and this signal is identified with S-parameter $S_{6,4}$. These cancellation signals 122B may cancel the self-interference from the second signal 120B, e.g., from $vtx_2$ through transmission elements 150A and 150B at E3 and E4. These cancellation signals 122A-122B may remove the self-interference that would otherwise exist in full duplex communication in a six-element array.

The array 112 may include the use of a multi-port digital combiner 170 which is incorporated into ports 1 and 2, which allows for the port to have two transmission elements 150A, 150B. The combiners 170 combine transmission elements E1 and E2, 150A, 150B to form port 1 and transmission elements E3 and E4, 150A, 150B to form port 2. By setting the respective weights on these additional transmission elements 150B, it may be possible to significantly reduce or eliminate the coupling between ports 1 and 3, and likewise for ports 2 and 4, using the cancellation signals, and thus allow full duplex operation without the aforementioned signal interferences.

FIG. 2B graphically depicts a combined bar chart which corresponds to the s-matrix for the 6 element array, per Equation 10, below. In particular, the 6×6 s-matrix of FIG. 2B depicts the element-to-element coupling prior to the combiners.

$$\begin{pmatrix} b_1 \\ b_2 \\ b_3 \\ b_4 \\ b_5 \\ b_6 \end{pmatrix} = \begin{pmatrix} s_{1,1} & s_{1,2} & s_{1,3} & s_{1,4} & s_{1,5} & s_{1,6} \\ s_{2,1} & s_{2,2} & s_{2,3} & s_{2,4} & s_{2,5} & s_{2,6} \\ s_{3,1} & s_{3,2} & s_{3,3} & s_{3,4} & s_{3,5} & s_{3,6} \\ s_{4,1} & s_{4,2} & s_{4,3} & s_{4,4} & s_{4,5} & s_{4,6} \\ s_{5,1} & s_{5,2} & s_{5,3} & s_{5,4} & s_{5,5} & s_{5,6} \\ s_{6,1} & s_{6,2} & s_{6,3} & s_{6,4} & s_{6,5} & s_{6,6} \end{pmatrix} \begin{pmatrix} a_1 \\ a_2 \\ a_3 \\ a_4 \\ a_5 \\ a_6 \end{pmatrix} = \qquad \text{Equation 10}$$

-continued $$
\begin{pmatrix}
a_1 s_{1,1} + a_2 s_{1,2} + a_3 s_{1,3} + a_4 s_{1,4} + a_5 s_{1,5} + a_6 s_{1,6} \\
a_1 s_{2,1} + a_2 s_{2,2} + a_3 s_{2,3} + a_4 s_{2,4} + a_5 s_{2,5} + a_6 s_{2,6} \\
a_1 s_{3,1} + a_2 s_{3,2} + a_3 s_{3,3} + a_4 s_{3,4} + a_5 s_{3,5} + a_6 s_{3,6} \\
a_1 s_{4,1} + a_2 s_{4,2} + a_3 s_{4,3} + a_4 s_{4,4} + a_5 s_{4,5} + a_6 s_{4,6} \\
a_1 s_{5,1} + a_2 s_{5,2} + a_3 s_{5,3} + a_4 s_{5,4} + a_5 s_{5,5} + a_6 s_{5,6} \\
a_1 s_{6,1} + a_2 s_{6,2} + a_3 s_{6,3} + a_4 s_{6,4} + a_5 s_{6,5} + a_6 s_{6,6}
\end{pmatrix}
$$

This can be represented in the following equations, in a similar manner to the equations used relative to FIGS. 1A-1B. Here, a weight (w) is applied to the transmit voltages at the additional transmission elements 150B, as shown in Equation 11:

$$
vrx_5 = \begin{pmatrix} s_{5,1} & s_{5,2} & s_{5,3} & s_{5,4} & s_{5,5} & s_{5,6} \end{pmatrix}
\begin{pmatrix}
vtx_1 w_1 \\
vtx_1 w_2 \\
vtx_2 w_3 \\
vtx_2 w_4 \\
0 \\
0
\end{pmatrix} =
\qquad \text{Equation 11}
$$

$$
(s_{5,1} w_1 + s_{5,2} w_2) vtx_1 + (s_{5,3} w_3 + s_{5,4} w_4) vtx_2
$$

If the weights (w) are selected so the coefficient for $vtx_1$ equals zero, then there is no $vtx_1$ term and no self-interference. In order words, by selecting the coefficient for $vtx_1$ to equal zero, it is possible to effectively cancel out the $vtx_1$ term which acts to remove the self-interference that would otherwise exist. This cancellation is depicted in FIG. 2A and shown mathematically in Equation 12, where cancellation signal 122A from transmission element E1, 150A ($S_{5,1}$) and cancellation signal 122A from transmission element E2, 150B ($S_{5,2}$) are modified by weight 1 ($w_1$) and weight 2 ($w_2$), respectively, such that they cancel interference between signal 120A and signal 120B during full duplex operation. Here, both transmission elements E1 and E2, 150A, 150B transmit the cancellation signals 122A into receiving element E5, 152, of port 3. Accordingly, it is possible to adjust the coefficient such that a sum of $w_1$ and $w_2$ can equal zero, which effectively eliminates the $vtx_1$ term in Equation 11. This is illustrated in Equation 12:

$$
s_{5,1} w_1 + s_{5,2} w_2 = 0 \qquad \text{Equation 12}
$$

Relative to Equation 11 and Equation 12, it is noted that it is desirable to select $w_3$ and $w_4$, which are the weights for the opposing signal transmission on $vtx_2$, to ensure that the selection does not result in the $vtx_2$ term to be zero. The $vtx_2$ voltage is the desired result, and as such, it must be weighted appropriately to not be canceled. In a system with identical arrays on both sides of the link, $w_1$ equals $w_3$ and $w_2$ equals $w_4$. In practical situations, it is common and expected for $w_3$ and $w_4$ to not equal $w_1$ and $w_2$, respectively, since they're in different parts of the link with different arrays and in different environments.

From Equations 11 and 12, it may be possible to achieve the zero result in Equation 12 when the ratio of Equation 13 is true. For instance, when w1=1 the result is:

$$
w_2 = \frac{-s_{5,1}}{s_{5,2}} w_1 = \frac{-s_{5,1}}{s_{5,2}} \qquad \text{Equation 13}
$$

Other selections of $w_1$ can also be made.

Figure 3B:
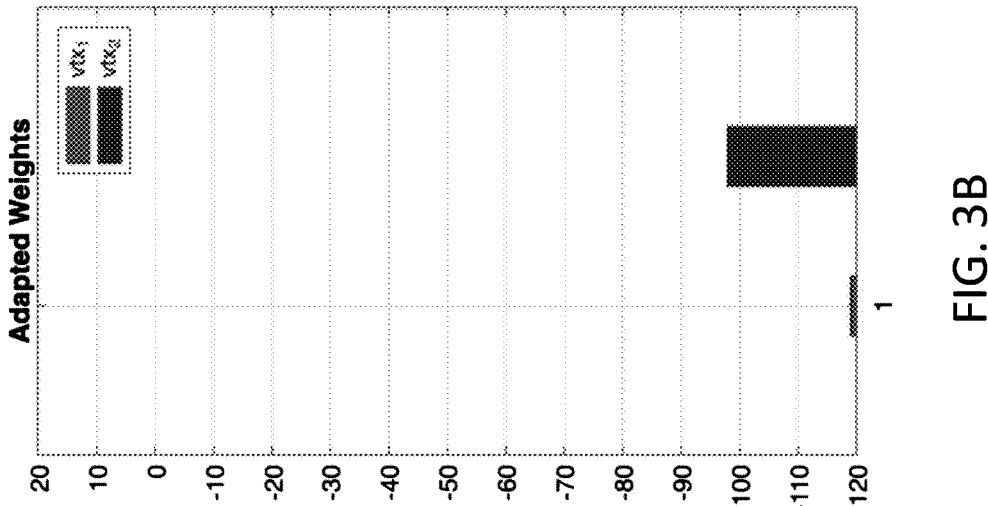
FIGS. 3A and 3B are graphical illustrations of the signals in a six element, full duplex adaptive array system without weighting, in accordance with exemplary embodiments of the present disclosure.
Figure 3A:
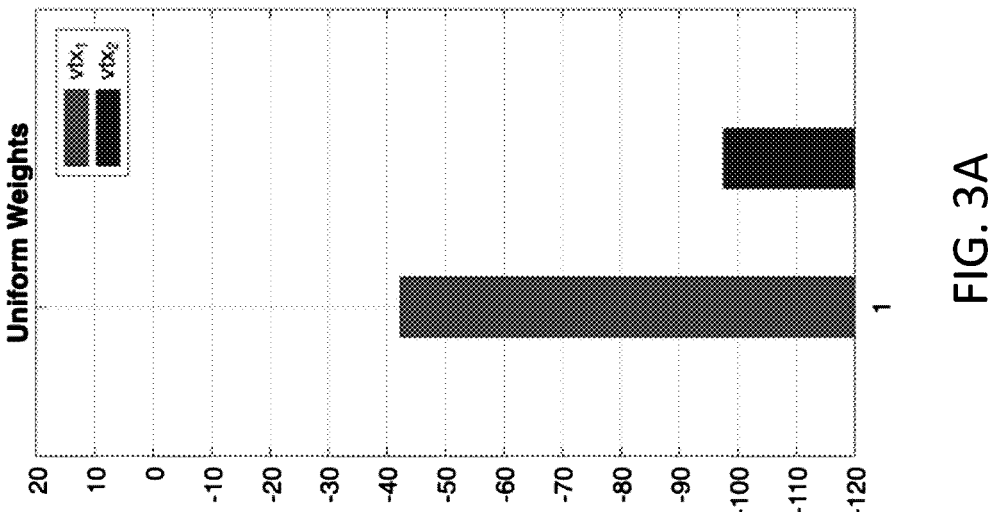

There's a second consideration, particularly when there is a desire to conserve power, which is common. For a lossless coupler, $w_1{}^2 + w_2{}^2 = 1$, which can be achieved, for instance, by dividing by the norm, e.g., the square root of the sum of the magnitude of the squares. Since the arrays used on FIG. 2A are identical, the same weights can be used for each array. This is illustrated in FIGS. 3A-3B, which are graphs illustrating the signals without weighting, also referred to uniform weights, (FIG. 3A) and adapted weights (FIG. 3B) of the six element, full duplex adaptive array system 110 of FIG. 2A, in accordance with exemplary embodiments of the present disclosure. In FIG. 3A, the weights are set to $$
w_1 = w_2 = \frac{1}{\sqrt{2}}.
$$

This is called the uniform weight case of a typically two-to-one divider. More specifically, the port 3 $vtx_1$ and $vtx_2$ signal levels are shown for the case of non-weighting, where the weight to all signals is uniform as compared to the use of adapted weights in FIG. 3B. In FIG. 3B, the self-interference or port-to-port coupling has been reduced from −46 db to below −120 db. Thus, FIG. 3A illustrates the signal levels before weights are applied, and FIG. 3B illustrates the signal levels after the signals are adapted with weights. In both figures the path from a 6, element to a 4 port network is shown. This transformation is a result of using a coupler, or a divider, and the functionality it provides, which allows a typical 6-port array (with 2 Tx and 1 Rx on each side) to be a 4-port network. It is noted that the element to element s-matrix does not change between the two cases. Only the coupler or divider weights are changed.

Figure 4:
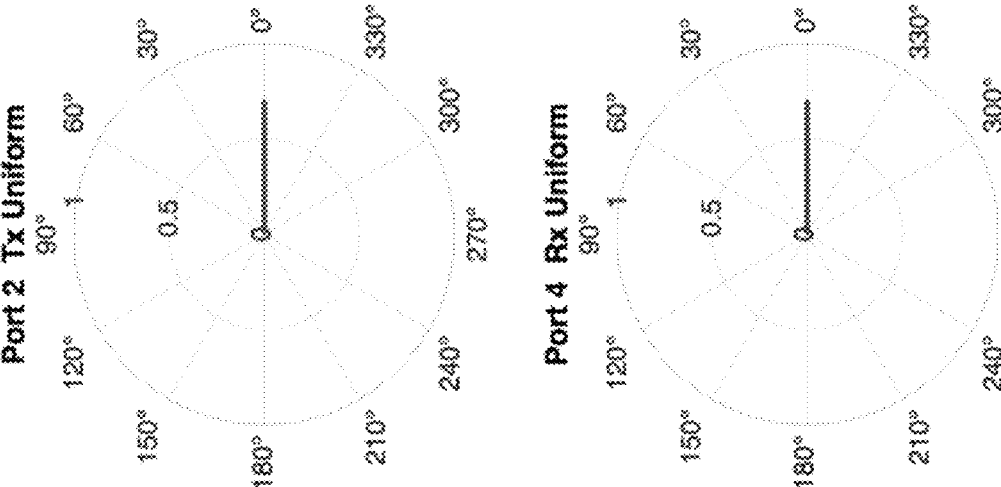
FIGS. 4-5 are illustrations of weights corresponding to the graphical illustrations of FIGS. 3A-3B, of the six element, full duplex adaptive array system, in accordance with exemplary embodiments of the present disclosure.
Figure 4:
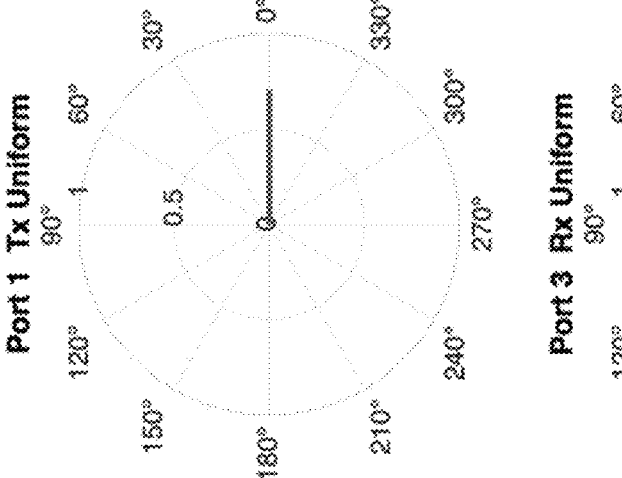
Figure 4:
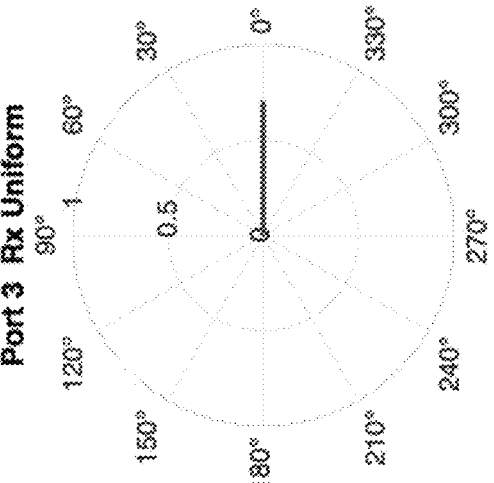
Figure 5:
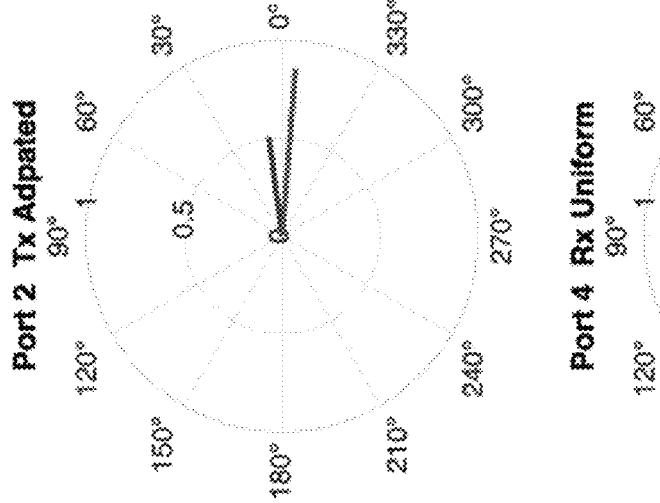
Figure 5:
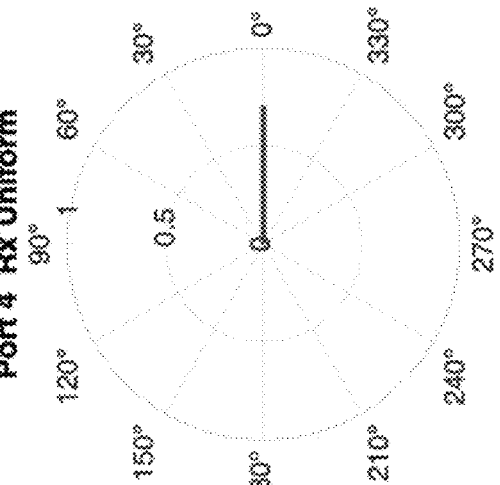
Figure 5:
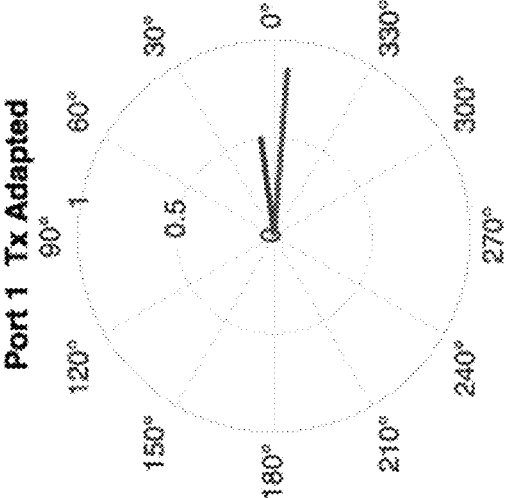
Figure 5:
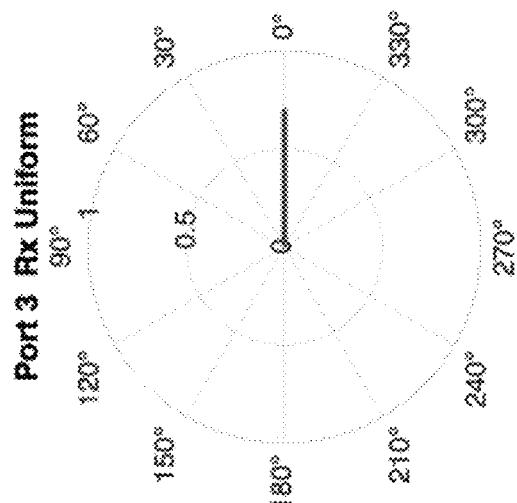

FIGS. 4-5 illustrate weights corresponding to the plot of FIGS. 3A-3B, of the six element, full duplex adaptive array system 110 of FIG. 2A, in accordance with exemplary embodiments of the present disclosure. These images illustrate the weights applied to signals from all four ports. The specific coupler weights shown in FIG. 4 correspond to the non-weighted example of FIG. 3A, while the weights for weighted (adapted) example are depicted in FIG. 5. In both cases there is a single Rx weight.

As shown in FIG. 4, before weighting, the received signals in ports 3 and 4 are equal to 1, which is derived from the aforementioned $$
w_1 = w_2 = \frac{1}{\sqrt{2}}
$$

while the transmit signals of ports 1 and 2 are at 0° and 0.707 in amplitude. When the weights for $w_1$ and $w_2$ are calculated, they will have differing amplitudes and slightly differing angles. This is due to the fact that element 2 and element 5 are closer together in physical distance than element 1 and element 5, which causes a different amplitude. Additionally, there is a phase difference between the two signals changes, but generally, the two amplitudes of the transmit signals will be 180° out of phase, due at least in part to the signal transmission geometry, such that phase shifting is not required to achieve in-phase signals. Thus, to achieve the desired weights, in some situations it may only be needed to adapt the signals to have the correct amplitude to provide for cancellation.

Figure 6:
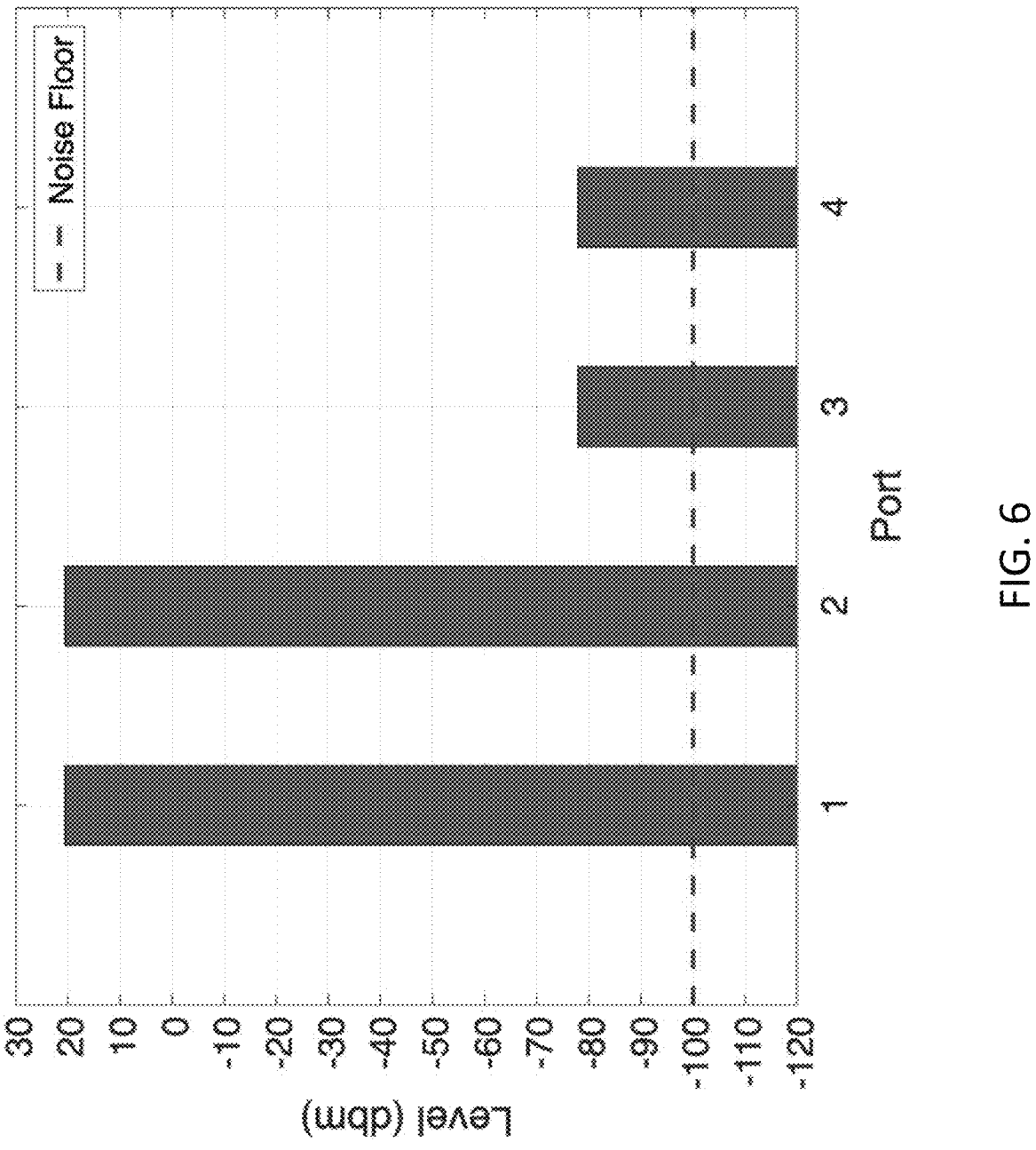
FIG. 6 is an illustration of signal levels at each of the network ports using the link parameters outlined by the link budget for use with the six element, full duplex adaptive array system, in accordance with exemplary embodiments of the present disclosure.

Next, the signal levels discussed relative to FIGS. 2A-5 can be understood relative to the link budget and the noise floor, as discussed earlier, where FIG. 6 illustrates the signal levels at each of the network ports using the link budget outlined by the link budget, with $P_t=20$ dbm. Here, ports 1 and 2 are the transmit ports and ports 3 and 4 are the receive ports, with port 3 being the base station receive port, and port 4 being the remote receive port. The noise floor is −100 dbm, which is calculated as the noise power ($P_n$) previously discussed. Accordingly, when the transmission power (Pt) is applied at 20 dbm into $vtx_1$ and $vtx_2$ to make them a 20 dbm signal transmission, the transmitted signal levels from ports 1 and 2 would be 20 dbm, as depicted in FIG. 6, while the received signal level at ports 3 and 4 would be approximately −77 dbm, as shown. As the received signal levels are above the noise floor of −100 dbm, the resulting transmission would be successful.

Figure 7:
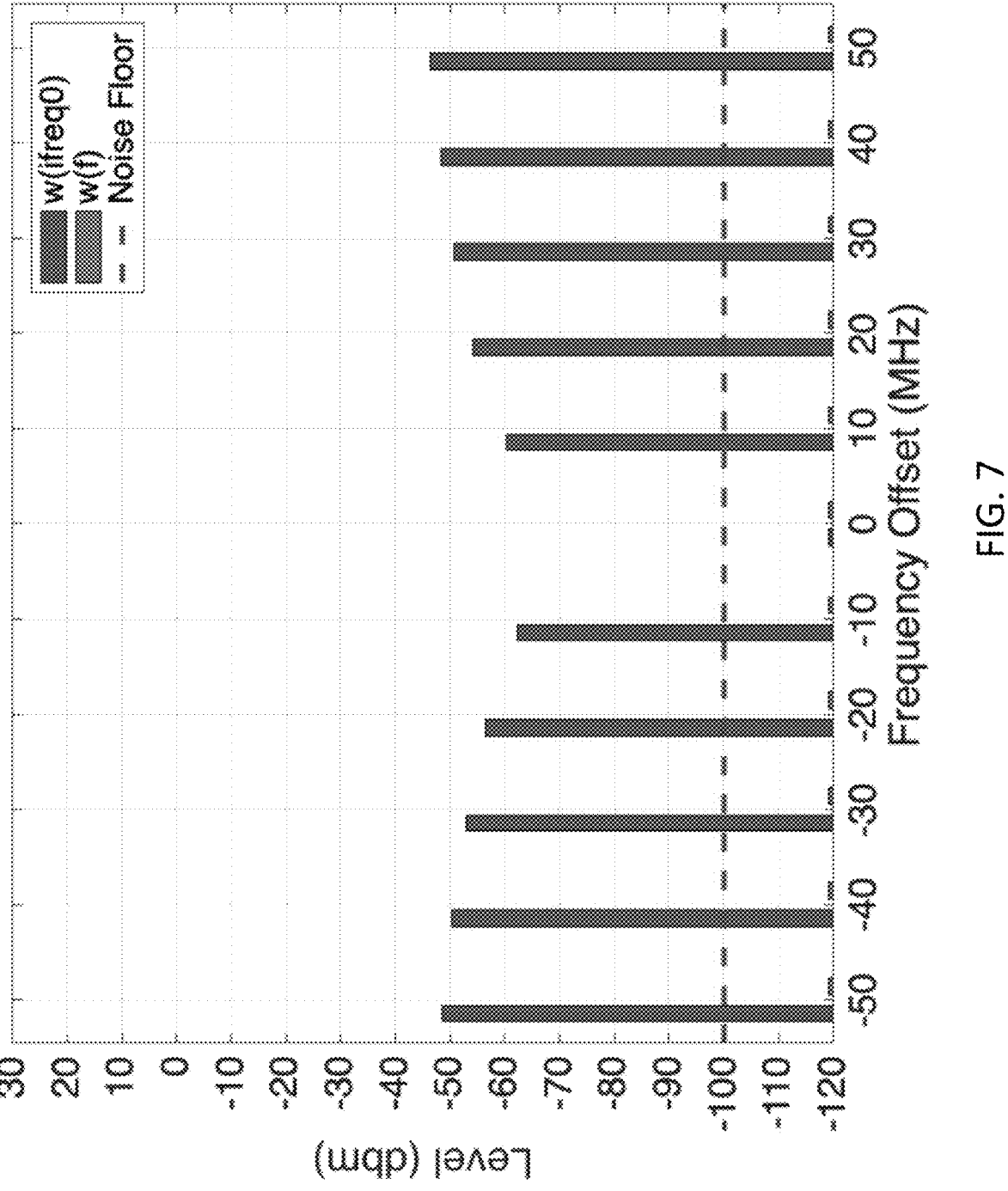
FIG. 7 is an illustration of weights applied relative to frequency for use with the six element, full duplex adaptive array system, in accordance with exemplary embodiments of the present disclosure.

Next, FIG. 7 illustrates weights applied relative to frequency. The discussion relative to FIGS. 2A-6 is assumed to be completed at a single frequency, but the s-matrix will vary for each different frequency. As such, if it is desired to calculate the weights at each frequency, the signal at each frequency must be considered. In the present examples of this disclosure, the weights were calculated at the center frequency of the band, 3600 MHz. FIG. 7 plots the base station receive levels versus frequency over a 100 MHz band using the weights calculated at 3600 MHZ. As can be seen in FIG. 7, a weight calculated at a frequency 0, for instance, has good signal cancellation at the target frequency of 0, but when the frequency is changed, the signal cancellation may drastically decrease. The w(ifreq0) levels are levels at each frequency using the weights calculated at the center frequency. The w(f) levels are the levels with new weights calculated at each frequency. This difference in signal cancellation is due to the fact that the signal vectors are substantially affected by the frequency. However, with modern high-speed processing, it is possible to calculate the weight at each frequency with relative ease. For instance, this can be readily done for some of the modern modulation schemes such as orthogonal frequency-division multiplexing (OFDM). OFDM signals use a fast Fourier transformation (FFT) to generate a set of frequency tones across the band. A weight can be calculated and used for each frequency.

Figure 8:
FIG. 8 illustrates a plot of the weights of FIG. 7 at each frequency for use with the six element, full duplex adaptive array system, in accordance with exemplary embodiments of the present disclosure.

FIG. 8 illustrates a plot of the weights (w(f)) at each frequency. As shown, the weights may only change a few degrees and a few percent in amplitude with frequency, but even small differences in the weights can affect the cancellation since it can prevent the weights from achieving zero for the part of the signal intended to be cancelled. For instance, a 0.1 degree error results in a cancellation error of −55 db. A 1.0 degree error degrades the cancellation to −35 db, such that there is a 20 db difference. This highlights the need for accurate weight calculation to ensure that the weights produce the desired effect.

The need for accurate weight calculation is highlighted in the example of FIG. 8, where only a small degree difference can lead to significant cancellation errors. As such, it may be desired for the weights to be calculated using digital precision. This can be done by exciting the Tx ports with high precision digital to analog converts (DAC) and measuring the Rx levels with high precision analog to digital converts (ADC). Continuing with the example, per Equation 11, when $vport_3=vrx_5=(s_{5,1}w_1+s_{5,2}w_2)vtx_1$, $vtx_2=0$. For $w_1=1$, $w_2=0$, $vtx_1=vport_1$, then $vport_3=s_{5,1}vport_1$. As such, the voltage at $vport_1$ may be set by DAC 1 and voltage at port 3 may be measured by ADC 1. Then $$s_{5,1} = \frac{vport_3}{vport_1}$$

for a 12 bit accuracy if the ADC and DAC are 12 bit converters. Likewise for $$w_1 = 0, w_2 = 1, s_{5,2} = \frac{vport_3}{vport_1}.$$

From this the weights can be calculated using Equation 12. This approach may compensate for the mismatches in the respective signal paths due to amplifier imbalances, DAC mismatch etc.

Figure 9:
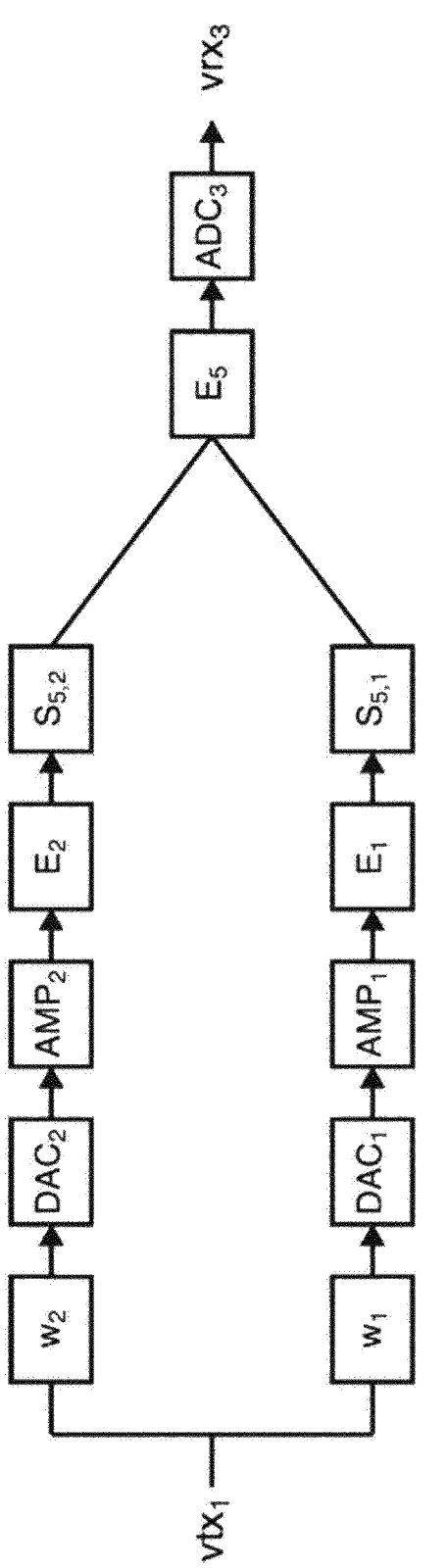
FIG. 9 is an illustration of an example of a signal processing circuit which may be used to achieve weight calculation for use with the six element, full duplex adaptive array system, in accordance with exemplary embodiments of the present disclosure.

FIG. 9 illustrates one example of a signal processing circuit which may be used to achieve weight calculation. As shown, the transmission signal voltage, vtx1, is digitally set by weight 1 ($W_1$), and is then transmitted to $DAC_1$, then to a power amplifier ($AMP_1$) to achieve +20 dbm, and then it goes to the element ($E_1$) which couples to element 5 ($E_5$), which is represented by S-parameter $S_{5,1}$. A similar path is followed for the second weight (W2), where the signal is transmitted to $DAC_2$, then to a power amplifier ($AMP_2$) to achieve +20 dbm, and then it goes to the element ($E_2$) which couples to element 5 ($E_5$), which is represented by S-parameter $S_{5,2}$. At $E_5$, the voltages from $E_1$ and $E_2$ are the same amplitudes and 180 out of phase, thereby allowing for cancellation of the interfering signal. It is noted that additional legs of the circuit may be included, despite not being depicted.

It is further noted that there may be other errors within the circuit elements between the legs of the circuit. For instance, the amplifiers may not necessarily be identical, and the DACs may not be identical either, and as such, there is the possibility for errors in the signal paths that should be accounted for. In one example, these errors can be accounted for by first setting the weights ($W_1$ & $W_2$) to predetermined values, such as $W_1=0$ and $W_2=1$, and then measuring the voltage at the $ADC_3$. Then the weight values are changed, such as by making $W_1=1$ and $W_2=0$, and then remeasuring the voltage at $ADC_3$. These two voltage measurements can then be divided to achieve a ratio of the voltages at each port, e.g., ports 3 and 1, which can indicate all of the errors in both legs of the circuit. This ratio can be used to accurately measure the errors in the circuit, such that the weights can be accurately set despite errors in the circuitry. In comparison, conventional techniques only estimate errors.

Figures 10A, 10B, 10C, 10D:
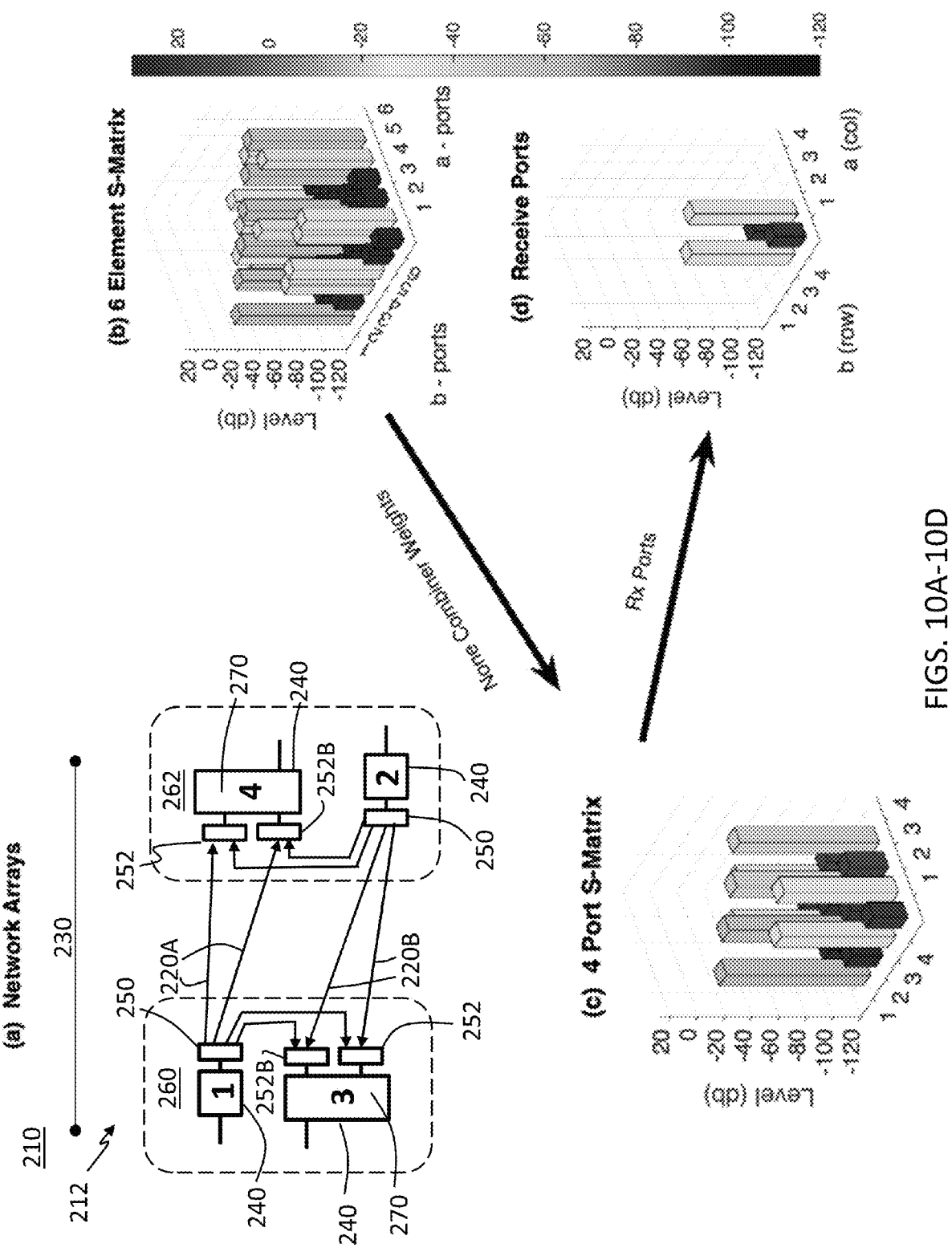
FIGS. 10A-10D are diagrammatical illustrations of a six element, full duplex adaptive array system, in accordance with exemplary embodiments of the present disclosure.

Turning next to FIGS. 10A-10D, they are diagrammatical illustrations of a six element, full duplex adaptive array system 210, in accordance with exemplary embodiments of the present disclosure. In particular, the system 210 of FIGS. 10A-10D illustrates a reverse operation of the techniques described relative to system 110, where the weighting of the signals for cancellation of self-interference is used on the receive side of the array 212. For example, the techniques described relative to FIGS. 2A-9 can be reversed and used on the receive side of the array using two Rx elements and one Tx element. FIG. 10A shows this arrangement, where the second Rx element 252B has been added to each side of the array 212, and in particular, at the receiving ports 240, such that each location of the array 212 has two receiving elements 252, 252B, and one transmission element 250. This results in a 6 element network, which is reduced to a four port network by use of two Rx couplers/dividers, as shown, with one on each side of the array 212. This architecture provides a way of reducing the element-to-element coupling in each array 212 while preserving the transmission across the link 230 between the first location 260, e.g., the base station and the second location 262, e.g., remote or other base station.

The array 212 may include the use of a multi-port digital combiner 270 which is incorporated into receiving ports 3 and 4, which allows for the port to have two receiving elements. The combiners 270 combine receiving elements 3 and 4, 252, 252B to form port 3 and receiving elements 5 and 6, 252, 252B to form port 4. By setting the respective weights on these additional receiving elements 252B, it may be possible to significantly reduce or eliminate the coupling between ports 1 and 3, and likewise for ports 2 and 4, and thus allow full duplex operation without the aforementioned signal interferences.

FIG. 10B illustrates the 6 element S-matrix for this array without weights, while FIG. 10C illustrates the 4-port S-matrix with weights applied. The resulting signals are depicted in FIG. 10D, which illustrates the signal voltage received at the Rx ports, e.g., ports 3 and 4. Additionally, Equation 14 shows the respective mathematical operation to achieve the weighting for signal self-interference cancellation, where the weights are located on the Rx side of the equation, versus relative to system 110 where the weights are on the Tx side.

$$vrx_3 = (s_{3,2}w_3 + s_{4,2}w_4)vtx_2 + (s_{3,1}w_3 + s_{4,1}w_4)vtx_1 \qquad \text{Equation 14}$$

Figure 11:
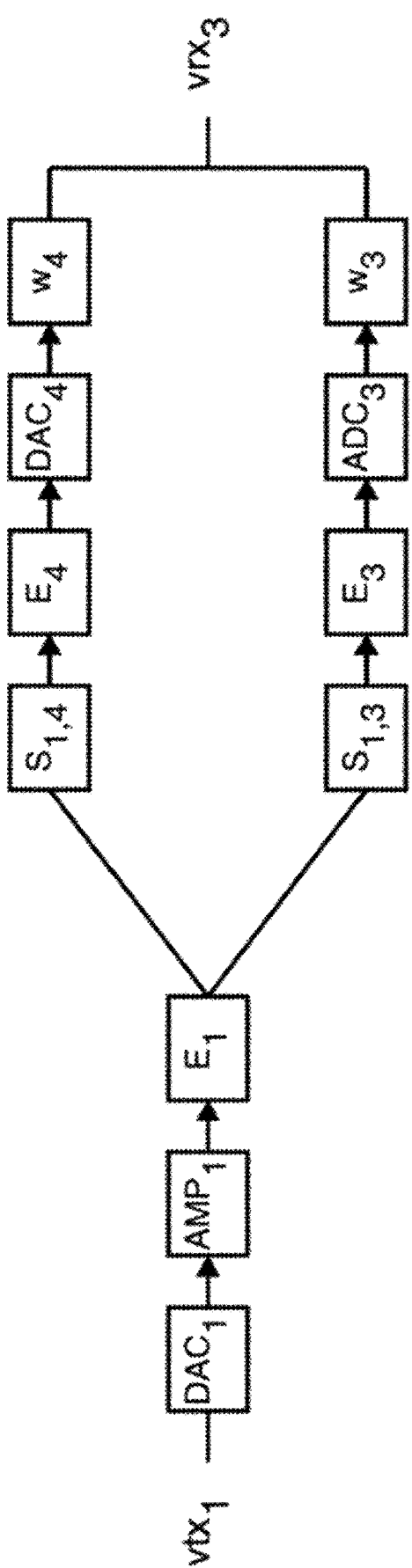
FIG. 11 is an illustration of an example of a signal processing circuit which may be used to achieve weight calculation of FIGS. 10A-10D for use with the six element, full duplex adaptive array system, in accordance with exemplary embodiments of the present disclosure.

FIG. 11 illustrates one example of a signal processing circuit which may be used to achieve weight calculation for the array depicted in FIG. 10A. Specifically, as shown, FIG. 11 depicts the circuit elements for each path or each leg of the signal path, which functions similar to as described relative to FIG. 9, but in reverse order. Unlike in FIG. 9, however, the circuit of FIG. 11 uses only one power amplifier (AMP1). The weights are calculated by measuring $v_3=vrx_3$ with $w_3=1$, $w_4=0$ and then $v_4=vrx_3$ with $w_3=0$, $w_4=1$. Then using $$w_4 = \frac{-v_3}{v_4}w_3,$$

and $\|w_3\|^2 + \|w_4\|^2 = 1$. Starting with the assumption $w_{3=1}$, this reduces to:

$$w_3 = \frac{1}{d}, w_4 = \frac{-\left(\frac{v_3}{v_4}\right)}{d}, d = \sqrt{1 + \left\|\frac{v_3}{v_4}\right\|^2} \qquad \text{Equation 15}$$

Accordingly, similar to as discussed relative to FIG. 9, the resulting ratio derived can be used to accurately measure the errors in the circuit on the Rx side, such that the weights can be accurately set despite errors in the circuitry.

Modern point to multipoint applications require multi-element steerable arrays. The systems described herein can be further extrapolated to a multi-element array where there is signal self-interference cancellation on both the transmit and receive sides. FIGS. 12-15 depict variations of this possible arrangement.

Figure 12:
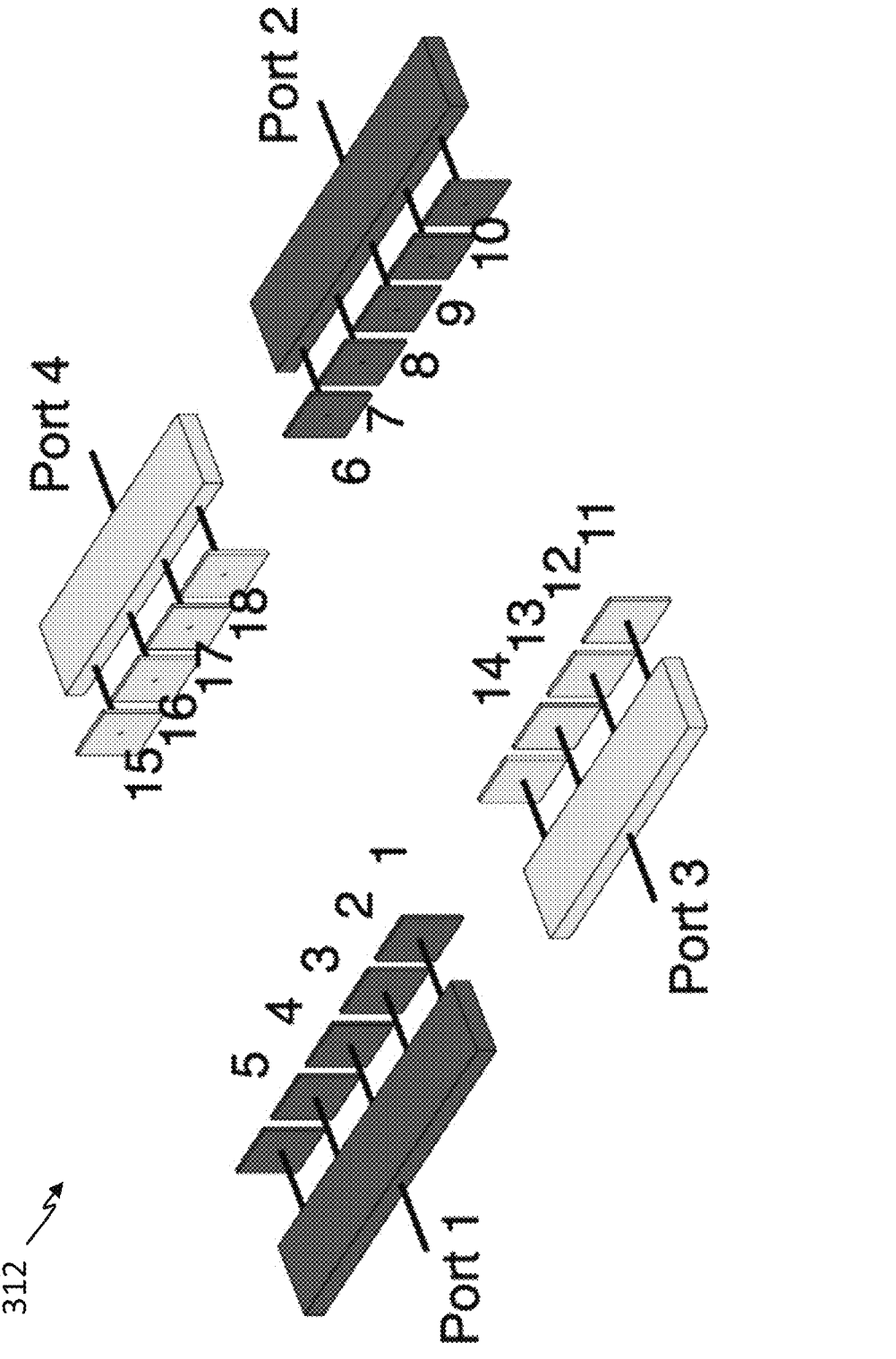
FIG. 12 is an illustration depicting a multi-element array of a full duplex adaptive array system, in accordance with exemplary embodiments of the present disclosure.
Figures 13A, 13B, 13C, 13D:
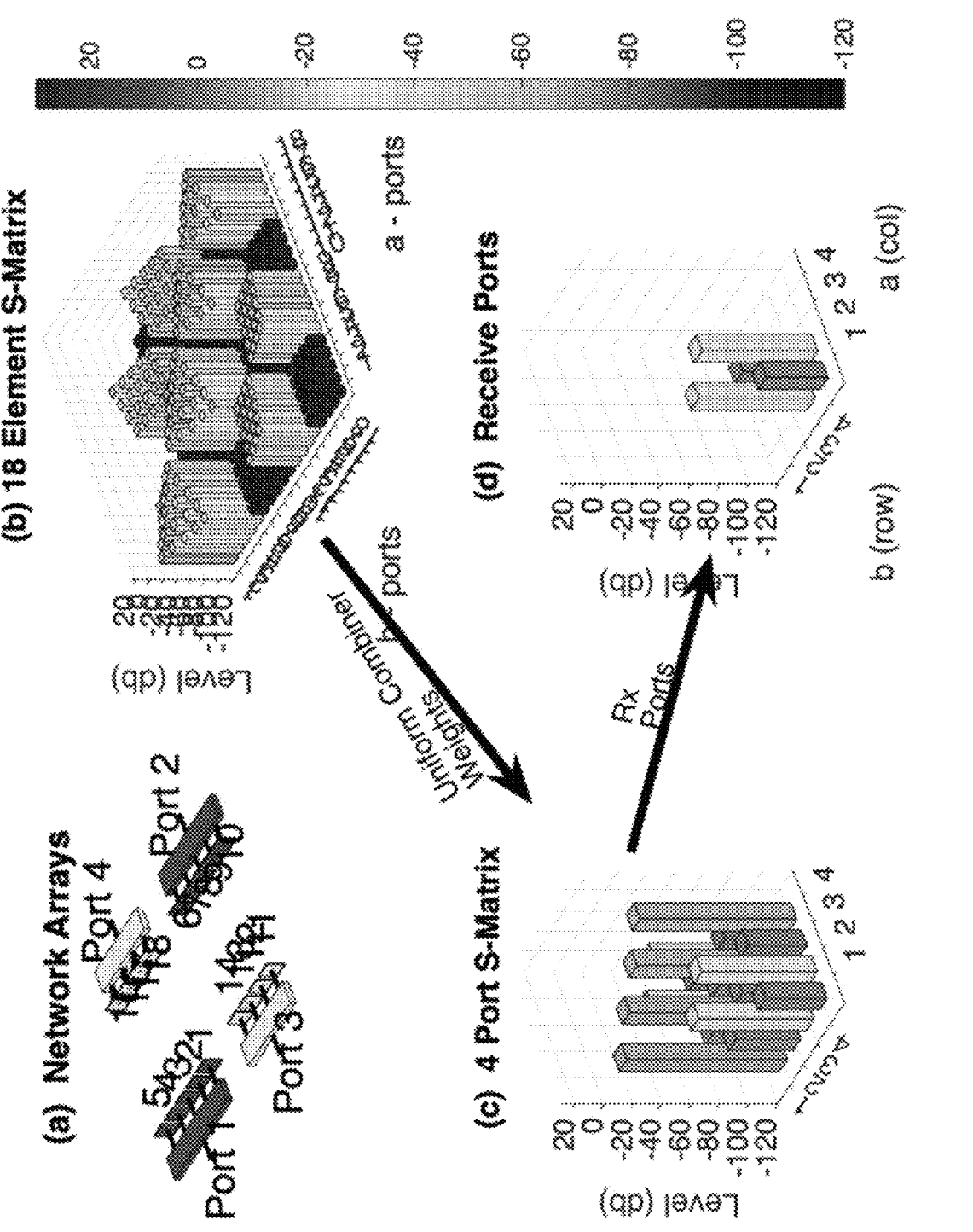
Figures 14A, 14B, 14C, 14D:
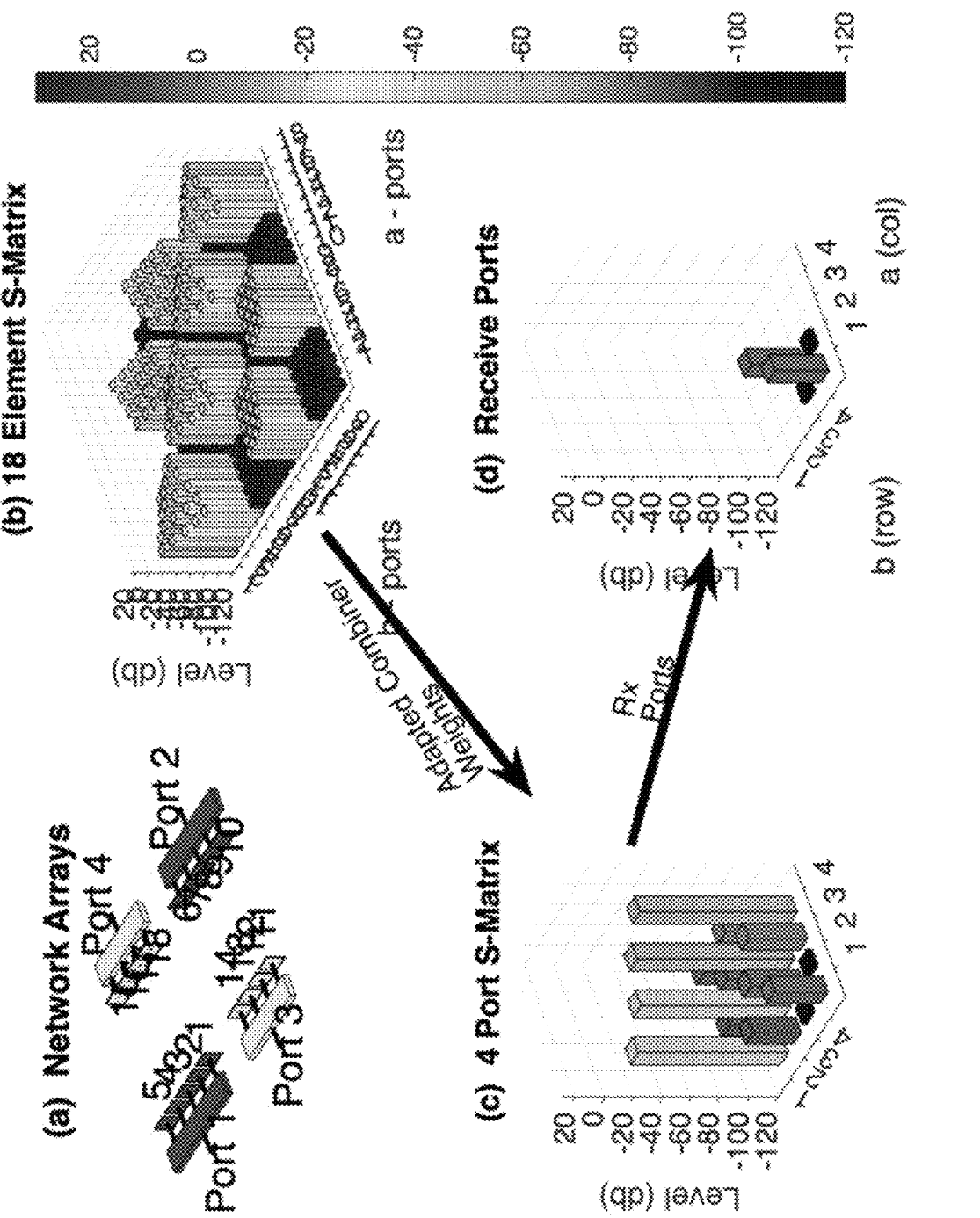

With respect to FIG. 12, it depicts a multi-element array 312 which includes nine elements on one side of the array 312 and nine elements on the other side of the array 312, where each transmit port, e.g., ports 1 and 2, has five Tx elements with a 5:1 power divider and each receive port, e.g., ports 3 and 4, has four Rx elements with a 4:1 power divider. This arrangement may mean that only one power amplifier is needed. While 120 db cancellation may not be achieved, the use of the multi-element receiver will compensate for it. Accordingly, the use of weights to remove self-interference within the signals on both the Tx and Rx side may allow for large multi-element arrays to be used with success.

Figure 15:
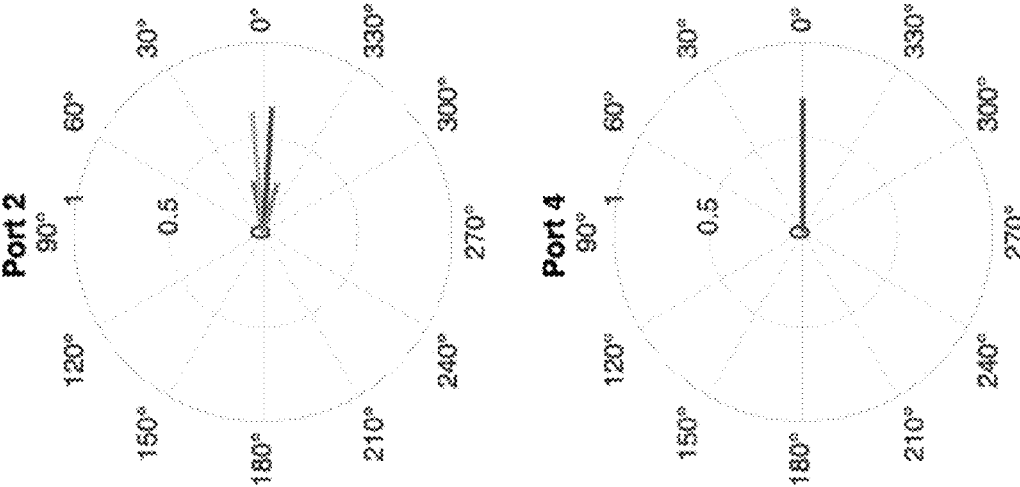
Figure 15:
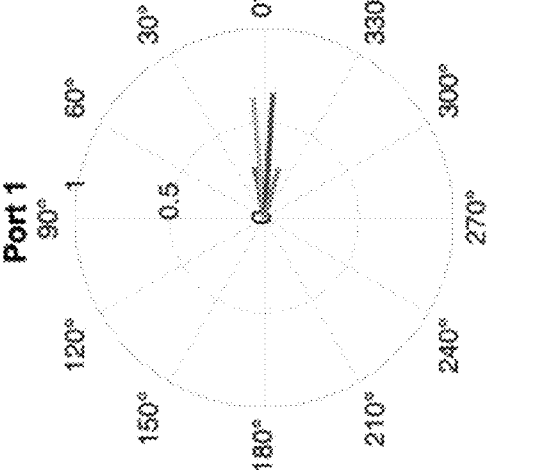
Figure 15:
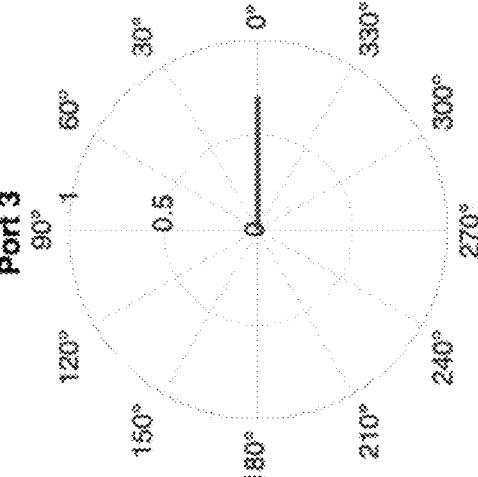

FIGS. 13A-13D illustrate the four port results or no weights, e.g., where the Rx is uniform and the Tx is uniform, where weights for self-interference cancellation have not been added. As can be seen, the self-interference level is −37 dbm. FIGS. 14A-14D illustrate the four port results with no weights on the Rx side, but with adapted weights on the Tx side. As shown, the self-interference is less than −120 dbm, well below the noise floor, which effectively limits the effect of any self-interference making it negligible. FIG. 15 illustrates the plot chart which corresponds to FIGS. 14A-14D, which depicts the relative amplitude and angle of the signals after weighting in transmit ports 1 and 2.

FIG. 16 is a flowchart 400 illustrating a method of self-interference cancellation using a full duplex adaptive array in accordance with exemplary embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, at least four ports within a network array are provided, wherein at least two transmission elements are at a first port, at least two transmission elements are at a second port, at least one receiving element is at a third port, and at least one receiving element is at a fourth port, and wherein a plurality of network paths are connected between transmission elements and receiving elements in the network array. At least one signal is transmitted along at least a first network path from the at least two transmission elements of the first port to the receiving element of the fourth port (block 404). The at least one signal is transmitted along at least a second network path from the at least two transmission elements of the first port to the receiving element of the third port (block 406). A weight is applied to at least one of the at least two transmission elements of the first port, whereby the weight modifies the at least one signal transmitted along the second network path to the receiving element of the third port to cancel signal interference caused by the at least one signal at the third port during full duplex operation of the network array (block 408). Any number of additional steps, processes, functions, or variations thereof may be included with the method, including any disclosed in any part of this document, all of which are considered within the scope of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A full duplex adaptive array system, comprising:

a network array;

at least four ports within the network array, wherein at least two transmission elements are at a first port, at least two transmission elements are at a second port, at least one receiving element is at a third port, and at least one receiving element is at a fourth port;

a plurality of network paths connected between transmission elements and receiving elements in the network array, wherein:

at least one signal is transmitted along at least a first network path from the at least two transmission elements of the first port to the receiving element of the fourth port;

the at least one signal is transmitted along at least a second network path from the at least two transmission elements of the first port to the receiving element of the third port; and a weight is adaptively applied to at least one of the at least two transmission elements of the first port, wherein the weight is applied relative to a frequency of the at least one signal, the weight being calculated based on a measured self-interference of the at least one signal determined from a difference between a transmit power and a noise power of the at least one signal, wherein the weight modifies the at least one signal transmitted along the second network path to the receiving element of the third port to cancel signal interference caused by the at least one signal at the third port during full duplex operation of the network array.

2. The system of claim 1, wherein the weight applied to at least one of the at least two transmission elements of the first port is applied to a transmit voltage of the at least one signal.

3. The system of claim 2, wherein the weight applied to at least one of the at least two transmission elements of the first port is selected for the transmit voltage of the at least one signal to equal zero.

4. The system of claim 1, wherein the weight applied to at least one of the at least two transmission elements of the first port further comprises a first weight applied to one transmission element of the first port and a second weight applied to another transmission element of the first port, wherein the first and second weights modify the at least one signal transmitted from both of the at least two transmission elements of the first port along the second network path to the receiving element of the third port to provide a first weight-modified signal and a second weight-modified signal.

5. The system of claim 4, wherein a sum of the first weight and the second weight equals zero.

6. The system of claim 4, wherein first weight-modified signal and the second weight-modified signal have different amplitudes.

7. The system of claim 6, wherein the different amplitudes of the first weight-modified signal and the second weight-modified signal are 180° out of phase.

8. The system of claim 1, wherein the at least two transmission elements of the first port are coupled with a coupler or combiner.

9. The system of claim 1, wherein the weight is applied to the at least one of the at least two transmission elements of the first port at a target frequency.

10. The system of claim 9, wherein a modulation scheme is used to apply the weight to the at least one of the at least two transmission elements of the first port at one or more target frequencies.

11. A full duplex adaptive array system, comprising:

a network array;

at least four ports within the network array, wherein at least two transmission elements are at a first port, at least two transmission elements are at a second port, at least one receiving element is at a third port, and at least one receiving element is at a fourth port;

a plurality of network paths connected between transmission elements and receiving elements in the network array, wherein:

at least a first signal is transmitted along at least a first network path from the at least two transmission elements of the first port to the receiving element of the fourth port;

the first signal is transmitted along at least a second network path from the at least two transmission elements of the first port to the receiving element of the third port;

at least a second signal is transmitted along at least a third network path from the at least two transmission elements of the second port to the receiving element of the fourth port;

the second signal is transmitted along at least a fourth network path from the at least two transmission elements of the second port to the receiving element of the third port;

a first weight is applied to at least one of the at least two transmission elements of the first port, wherein the weight modifies the first signal transmitted along the second network path to the receiving element of the third port to cancel signal interference caused by the first signal at the third port during full duplex operation of the network array; and a second weight is applied to at least one of the at least two transmission elements of the second port, wherein the weight modifies the second signal transmitted along the fourth network path to the receiving element of the fourth port to cancel signal interference caused by the second signal at the fourth port during full duplex operation of the network array.

12. The system of claim 11, wherein the first weight does not equal the second weight.

13. A method of self-interference cancellation using a full duplex adaptive array, the method comprising:

providing at least four ports within a network array, wherein at least two transmission elements are at a first port, at least two transmission elements are at a second port, at least one receiving element is at a third port, and at least one receiving element is at a fourth port, and wherein a plurality of network paths are connected between transmission elements and receiving elements in the network array;

transmitting at least one signal along at least a first network path from the at least two transmission elements of the first port to the receiving element of the fourth port;

transmitting the at least one signal along at least a second network path from the at least two transmission elements of the first port to the receiving element of the third port; and adaptively applying a weight to at least one of the at least two transmission elements of the first port, wherein the weight is applied relative to a frequency of the at least one signal, the weight being calculated based on a measured self-interference of the at least one signal determined from a difference between a transmit power and a noise power of the at least one signal, whereby the weight modifies the at least one signal transmitted along the second network path to the receiving element of the third port to cancel signal interference caused by the at least one signal at the third port during full duplex operation of the network array.

14. The method of claim 13, wherein applying the weight to at least one of the at least two transmission elements of the first port further comprises applying the weight to a transmit voltage of the at least one signal.

15. The method of claim 13, wherein applying the weight to at least one of the at least two transmission elements of the first port further comprises applying a first weight to one transmission element of the first port and applying a second weight to another transmission element of the first port, whereby the first and second weights modify the at least one signal transmitted from both of the at least two transmission elements of the first port along the second network path to the receiving element of the third port to provide a first weight-modified signal and a second weight-modified signal.

16. The method of claim 15, wherein a sum of the first weight and the second weight equals zero.

17. The method of claim 15, wherein first weight-modified signal and the second weight-modified signal have different amplitudes.

18. The method of claim 17, wherein the different amplitudes of the first weight-modified signal and the second weight-modified signal are 180° out of phase.

19. The method of claim 13, further comprising applying the weight to the at least one of the at least two transmission elements of the first port at a target frequency.

20. The method of claim 19, further comprising applying the weight to the at least one of the at least two transmission elements of the first port at a target frequency with a modulation scheme.

*   *   *   *   *